(12) United States Patent
Phillips et al.

(10) Patent No.: US 12,523,486 B2
(45) Date of Patent: Jan. 13, 2026

(54) SYSTEMS AND METHODS FOR ENGAGING NAVIGATION MODES BASED ON TRAFFIC EVENTS

(71) Applicant: Adeia Guides Inc., San Jose, CA (US)

(72) Inventors: Christopher Phillips, Hartwell, GA (US); Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 97 days.

(21) Appl. No.: 18/242,970

(22) Filed: Sep. 6, 2023

(65) Prior Publication Data

US 2025/0076068 A1    Mar. 6, 2025

(51) Int. Cl.
  *G01C 21/36* (2006.01)
  *G01C 21/34* (2006.01)

(52) U.S. Cl.
  CPC ..... *G01C 21/3632* (2013.01); *G01C 21/3461* (2013.01); *G01C 21/3492* (2013.01);
  (Continued)

(58) Field of Classification Search
  CPC ............ G01C 21/3632; G01C 21/3461; G01C 21/3492; G01C 21/367; G01C 21/3694; G01C 21/3697
  See application file for complete search history.

(56) References Cited

U.S. PATENT DOCUMENTS 11,473,922 B2   10/2022  Kandangath et al.
2013/0218453 A1  8/2013  Geelen
(Continued)

FOREIGN PATENT DOCUMENTS

WO    2013090121 A1   6/2013

OTHER PUBLICATIONS

"Google Maps Timeline," (https://support.google.com/maps/answer/6258979?hl=en&co=GENIE.Platform%3DDesktop), (6 pages).
(Continued)

*Primary Examiner* — Adnan M Mirza
(74) *Attorney, Agent, or Firm* — HALEY GUILIANO LLP

(57) ABSTRACT

Systems and methods are provided herein for engaging navigation modes based on traffic events. For example, the disclosed system receives a request for navigating a user device from a start location to a final destination. The user device optionally indicates that turn-by-turn navigational directions are to be provided from an intermediate location to the final destination. The system determines all possible routes the user device can take from the start location to the intermediate location and, in some embodiments, from the intermediate location to the final destination. Once engaged, the system monitors the user device's progress from the start location to the intermediate location without displaying turn-by-turn navigation. During which time, the system notifies the user device of any traffic events that may impact the journey. When prompted, the system provides turn-by-turn navigational directions to bypass the traffic event. Once the user device has successfully bypassed the traffic event, the system resumes monitoring the user device's progress without displaying turn-by-turn navigation. Once the user device reaches a predetermined distance from the intermediate location, the system provides turn-by-turn navigational directions from that location to the final destination.

18 Claims, 29 Drawing Sheets

(52) U.S. Cl.
CPC ....... *G01C 21/367* (2013.01); *G01C 21/3694* (2013.01); *G01C 21/3697* (2013.01)

(56) References Cited

U.S. PATENT DOCUMENTS

| | | | |
|---|---|---|---|
| 2016/0069695 A1 | 3/2016 | Broadbent et al. | |
| 2017/0146353 A1* | 5/2017 | Kroeller | G08G 1/0969 |
| 2018/0347996 A1* | 12/2018 | Coleman | G01C 21/3626 |
| 2021/0389142 A1* | 12/2021 | Kim | G01C 21/3691 |

OTHER PUBLICATIONS

"Here WeGo" (Maps & Navigation), (https://www.here.com/products/wego),(2 pages).
Hunt onX, "Does GPS Work Without Data?" (Oct. 17, 2023), (https://www.onxmaps.com/hunt/blog/does-gps-work-without-data#:%7E:text=GPS%20tracking%20on%20your%20phone,from%20satellites%20orbiting%20the%20planet.),(4 pages).
Mapbox, "Navigation Map APIs and SDKs" (https://mapbox.com/navigation), (8 pages).
Trigent Vantage, "GPS Programming in Android for Offline Maps," (https://blog.trigent.com/gps-programming-in-android-for-offline-maps/),(3 pages).
International Search Report and Written Opinion received for PCT Patent Application No. PCT/US24/45470, mailed on Dec. 17, 2024, 14 pages (14 pages of Original Document).

\* cited by examiner

Micro Navigation Mode                    Freedom Navigation Mode

SYSTEMS AND METHODS FOR ENGAGING NAVIGATION MODES BASED ON TRAFFIC EVENTS

BACKGROUND

The present disclosure relates to navigation, and in particular to systems and methods for engaging navigational modes based on traffic events.

SUMMARY

Navigation systems generate graphical interfaces to display directions from a starting location to an end destination. Navigational systems are typically used for walking directions, biking directions, and driving directions. Navigational systems are also used for marine and aviation applications. In one approach to driving navigation, systems may be built into vehicles (e.g., cars, trucks, and other passenger vehicles) or used with portable devices. For example, a smartphone may include built-in navigational systems provide user interface that can accept an input of a starting location—typically the device's location (e.g., as determined by a GPS system of the device)—and an end destination. In some implementations systems provide a GUI input for selecting whether the directions are to be provided or walking, biking, driving, or any combination of the three, and can be further combined with public transportation systems.

However, in some situations displaying complete, turn-by-turn navigational directions from a user devices' location to the final destination is unnecessary. Navigational directions are often only needed on portions of the journey which the user is not familiar with. For example, a user profile of a user may indicate that the user is comfortable with navigating themselves around familiar areas. For example, the user profile may indicate that turn-by-turn navigation is often started and/or ended at a location or area. In such an example, the user profile indicates that navigational directions are not needed around a user's home, place of work or school, or any other areas that the user device frequently travels. Further, the user profile may indicate that the user is routinely stops turn-by-turn directions within a certain distance of a particular location, e.g., home. Additionally, requiring user interface input to start and stop navigational directions distracts drivers who are required to input those selections. Instead, navigational directions are typically needed to traverse areas that the user is unfamiliar with. For example, navigational directions are required to visit a location in a different city. In such an example, the user may be familiar with navigating from their home (or other start location) to the other city. However, the user may not be sufficiently familiar with the other city to navigate within that city. In such an instance, the mapping system would not need to provide turn-by-turn directions from the start location to the other city but would provide directions once it reached, for example, the city limits, to the final destination. In such an example, users will typically drive from the start location to the city and then engage navigational services once they reach the city. But doing so prevents the user from taking advantage of other features of navigational services. For example, choosing to not use navigational services would disallow the user from obtaining traffic alerts that may impact the journey, for example, so-called speed traps where law enforcement officers lie in wait to catch potential speeders, road closures, or any other event that could impact the journey.

Alternatively, traditional navigational services could be engaged from the start location to the city. However, this has the unintended consequence of either preventing the user from using a preferred route or forcing the user to ignore navigational directions that direct the user on a route that the user does not want to travel. Forcing the user to ignore navigational directions can create frustration and/or confusion and could lead to distracted driving. Additionally, requiring user input to start and stop navigational directions before the user device reached the final destination distracts the driver and adds to factors that could lead to unsafe driving habits. Therefore, what is needed is a system that allows a user to navigate themselves for portion of a journey while taking advantage of other features and benefits of navigation without having to ignore directions or other notifications that current navigational systems subject users to.

To solve these problems, systems and methods are provided herein for providing navigational services without turn-by-turn directions from the starting location to the destination. In an exemplary implementation, the disclosed systems and methods allow a user device to navigate from a start location to a final destination, where traditional, turn-by-turn navigational directions are not provided at all or provided for only a portion of the journey, while retaining other benefits of traditional navigation. The benefits include, for example, information relating to the journey other than turn-by-turn directions, e.g., speed traps, construction zones, points of interest, traffic congestion, and an approximate time to arrival. In an embodiment, a navigation server receives a request for navigation in a freedom navigation mode. Consistent with the descriptions herein, freedom navigation generally refers to a navigational mode where traditional, turn-by-turn navigational directions are not displayed for the entirety of the route while still providing other benefits of navigation. In some embodiments, the request includes an end location (e.g., a location at which traditional, turn-by-turn directions are to be discontinued and can be either at the final destination or at another location).

While in freedom navigation mode, the user device does not display turn-by-turn directions from the start location to the destination. To accomplish this, the routes from user device's location to the end location are determined. If and when a traffic event is detected that may impact at least one of the routes, a traffic event notification is displayed on the user device. In some embodiments, the traffic event notification may further include an option to provide turn-by-turn navigational directions that redirect the user device around the detected traffic event.

For example, a mapping application receives a request to navigate from a start location to a final destination where turn-by-turn navigational directions are supplied from an intermediate location to the final destination. In such an example, the user device specifies the start location, the final destination, and the intermediate location from which turn-by-turn navigational directions are to be supplied. The navigation system engages freedom navigation mode wherein the navigation system determines all possible routes the user device may take from the start location to the intermediate location and monitor the user device's progress from the start location to the intermediate location.

Continuing with the previous example, once the user device reaches the intermediate location, the navigation system enables traditional, turn-by-turn navigation from that immediate location to the final destination. The navigation system may automatically engage turn-by-turn navigation directions or when prompted to do so. While in freedom navigation mode, the navigation system monitors traffic conditions, weather conditions, or any other conditions that may impact the journey from the start location to the intermediate location or the final destination. If a traffic event is identified that could impact the journey, the disclosed navigation system provides a notification at the user device with a user selectable input to engage micro navigation mode. Once in micro navigation mode, the navigation system provides turn-by-turn navigational directions that bypass the identified traffic event. Once the identified traffic event is successfully bypassed, the navigation system resumes freedom navigation mode while the user device continues its journey to the intermediate location.

In another exemplary implementation, the user device may be configured to navigate from a start location to a final destination where the user is unfamiliar with the area around the start location. The navigational systems provided herein are configurable to provide turn-by-turn navigational directions from the start location to an intermediate location, where the user is familiar with travelling from the intermediate location to the final destination. In such an implementation, the navigation system provides traditional turn-by-turn navigational directions to the user device from the start location to the intermediate location. Once the user device reaches the intermediate location (or within a distance to a known location, e.g., home), the navigation system engages freedom navigation mode to determine and monitor all possible routes between the intermediate location and the final destination for events that may impact the journey. If the navigation system detects a traffic event that may impact the journey, the navigation system provides a user selectable notification to the user device, and when selected, engages micro navigation mode. Once engaged, micro navigation mode provides turn-by-turn navigational directions to bypass the identified traffic event. Once the identified traffic event has been successfully bypassed, the navigation system resumes the previously engaged navigational mode. In some implementations, the navigation system uses historical data to optimize the user device's journey. In other implementations, the navigation system monitors the user device for characteristics of being lost, e.g., travelling the wrong direction, double-backing (i.e., making U-turns), or travelling paths that cannot lead to the final destination. By not providing turn-by-turn navigational directions for the entire journey, the navigation system provides benefits, for example, conserving battery life of the user device, minimizing user input with the user device thereby mitigating driver distractions, and conserving network bandwidth and other resources.

Accordingly, systems and methods are described herein for engaging and disengaging various navigational modes based on traffic events and user profile. In some embodiments, the disclosed systems and methods receive a request for navigation in a freedom navigation mode that includes an end location. In some embodiments, the navigation server causes the user device to not display directions to the end location during at least some period of navigating in the freedom navigation mode. In some embodiments, the request is received by a navigation server from a user device. In some embodiments, the disclosed navigation system determines a plurality of routes from a location of the user device to the end location. The navigation system further identifies a location of a traffic event on at least one route of the plurality of routes from the location of the user device to the end location. The navigation system determines a likelihood of the user device travelling near the identified location of the traffic event using a route of the plurality of routes based on a user profile associated with the device. In some embodiments, the navigation system bases this determination the location of the traffic event. The navigation system further sends a traffic event notification for display on the user device without display of directions to the end location. In some embodiments, the navigation system sends the traffic event notification based on the likelihood of the user device travelling near the identified location of the traffic event using a route of the plurality of routes.

In some embodiments, the navigation server causes the user device to display an indication of navigating from the location of the user device to the end location in the freedom navigation mode.

In some embodiments, the navigation system further receives a micro navigation request and a current location of the user device from the user device. The navigation system determines, based on the received current location of the user device, micro navigation routes that bypass the location of the traffic event. In some embodiments, the navigation system makes this determination in response to receiving the micro navigation request. The navigation system sends one or more of the routes of the micro navigation routes to the user device. The navigation system causes a route of the plurality of micro navigation routes to be displayed at the user device.

In some embodiments, the request for navigation further includes a requested navigation mode. For example, the request may include a request for traditional, turn-by-turn navigation or a request for freedom navigation.

In some embodiments, the navigation system determines the plurality of routes from the location of the user device to the end location includes additional steps. For example, in some embodiments, the navigation system retrieves mapping information related to a plurality of possible routes encompassing the location of the user device and the end location from a database. The navigation system further determines a plurality of possible routes from the location of the user device to the end location from the received mapping information. The navigation system ranks the determined plurality of possible routes based on travel time or travel distance. The navigation system determines a subset of the plurality of routes from the location of the user device to the end location based on a threshold. By determining a subset of routes based on a threshold, the navigation system conserves resources while still monitoring relevant routes that the user device is likely to use to travel from the start location to the destination. In some embodiments, the plurality of routes includes the determined subset of the plurality of routes from the location of the user device to the end location.

In some embodiments, the micro navigation request includes a micro navigation end location.

In some embodiments, each of the plurality of micro navigation routes ends within a predetermined distance of the micro navigation end location.

In some embodiments, the plurality of routes and the plurality of micro navigation routes are stored at the user device.

In another exemplary embodiment, the navigation system sends a request for navigation from a user device location to an end location in a freedom navigation mode, wherein during at least some period of navigating in the freedom navigation mode, the user device does not display directions to the end location. The navigation system determines a plurality of routes from the user device location to the end location. The navigation system identifies a location of a traffic event on at least one route of the plurality of routes from the user device location to the end location. The navigation system sends a micro navigation request from the user device to the navigation server. The navigation system determines a likelihood that the user device travelling near the identified location of the traffic event using a route of the plurality of routes based on a user profile associated with the device. In some embodiments, this determination is based on identifying the location of the traffic event. The navigation system displays a traffic event notification at the user device. In some embodiments, whether the system displays a traffic event notification is based on the likelihood of the user device travelling near the identified location of the traffic event using one of the plurality of routes.

In some embodiments, the navigation system determines a plurality of micro navigation routes. Each micro navigation route of the plurality of micro navigation routes begins at the user device location and ends at a location along a route of the plurality of routes from the user device location to the end location. Each micro navigation route of the plurality of micro navigation routes does not include the location of the traffic event.

Accordingly, using the techniques described herein, traditional turn-by-turn navigation is not provided or provided only for a portion of a journey the user is unfamiliar with while providing other benefits of traditional navigation, during which the navigation system provides freedom navigation mode. The system further provides micro navigation mode that directs the user around traffic events.

BRIEF DESCRIPTION OF THE DRAWINGS

The above and other objects and advantages of the disclosure will be apparent upon consideration of the following detailed description, taken in conjunction with the accompanying drawings, in which.

DETAILED DESCRIPTION

Figure 1A:
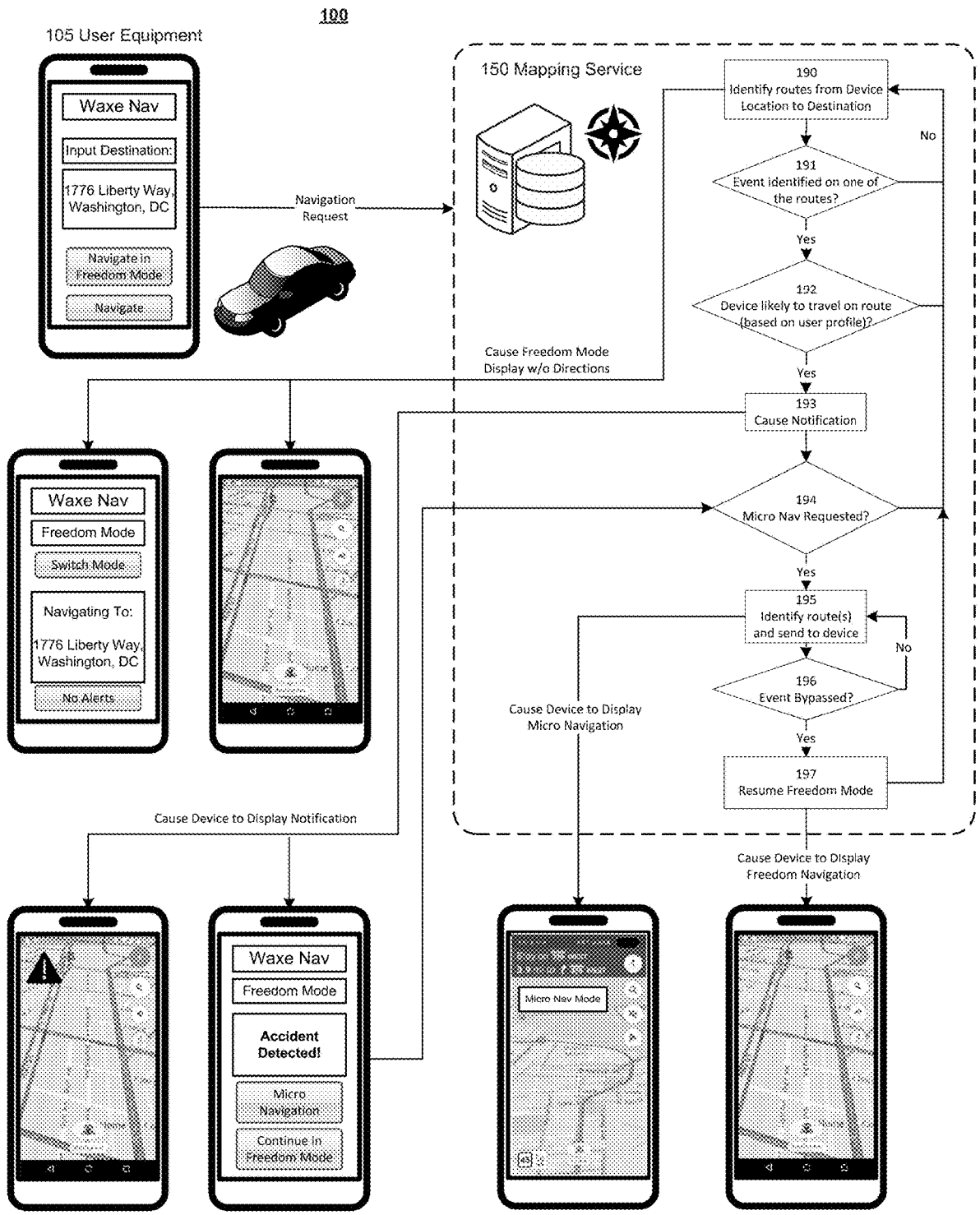
FIGS. 1A-1B depict illustrative diagrams of a system for starting and ending navigation, in accordance with embodiments of the disclosure.

The systems and methods disclosed herein provide user configurable navigation. Prior to reaching the location to begin traditional turn-by-turn navigation, which may be a city or entering the city limits of a city along the route, an attraction, entrance onto a specific road, a business location, etc., an exemplary embodiment of the system is engaged in a notification only mode. In notification only mode—or freedom navigation mode-provides notifications such as police ahead, police license check, accident, traffic jam, or road closure through audio and/or visual notifications. In freedom navigation mode, the system monitors the user device and its journey to the location to begin turn-by-turn navigation. While in this mode, every time the user travels on a new road, the system may optionally determine all of the possible routes the user device may take to reach the location to begin turn-by-turn navigation. This determination includes major interstates, major US roads, major state roads, and secondary road combinations. In some embodiments, the system implements an adaptively changing look-ahead area defining an area the system actively surveys for potential traffic events that could impact the journey. In some embodiments, the look ahead area is a default value. In other embodiments, the look ahead area is user-definable, system-definable, or both, and can be dynamically reconfigured. In some embodiments, the look ahead area varies based on projected future possible turns the user device may take based on the current road, travel direction, and other parameters.

In another exemplary embodiment, the system implements micro navigation mode where a driver requires navigational assistance. Micro navigation mode may be triggered by a traffic jam or congestion based on the user device travelling on a route the driver already knows and is on. When a configured navigational mode is not active and the user encounters a traffic event that impact the journey, e.g., a segment of busy traffic, it is desirable to be provided alternative routes that circumvent the traffic event. In such an embodiment, the system optionally engages a micro navigation mode before the user device reaches a preselected location. In other embodiments, micro navigation mode is triggered by road closures, traffic accidents, police activity, or any other event that impacts the journey. In some embodiments, the system queries the user device after the notification if navigational assistance is needed to navigate around the traffic event. Micro navigation mode may also be triggered based on the system detecting that the user device is making U-turns, turning on a road that is impossible (as determined as a possible route) to lead to the specified start location of turn-by-turn navigation, or traveling in the opposite direction and/or on a road that is not determined to be a possible route from the start location to the destination. In such an exemplary embodiment, the system prompts (e.g., auditory and/or visual) the user device if assistance is needed to arrive at the "waypoint" to begin turn-by-turn navigation. In some embodiments, once the user device has resumed travelling on a determined route, the system displays a notification at the user device that freedom navigation mode is resumed.

In another exemplary embodiment, the system recognizes that the user device turns into a business or other point of interest, e.g., a restaurant, fuel stop, etc., along the route. In some embodiments, this is a threshold value of distance from a possible route or specified by the user device. When the user device leaves the location and returns to travelling on a determined route, micro navigation mode will not be engaged. In other embodiments, when the user device leaves the location and continues traveling in a wrong direction based on all possible determined routes beyond the default threshold (or user specified threshold value), the system will display a notification at the user device quiring whether micro navigation mode should be engaged with turn-by-turn directions. In such an example, the user may choose to explore the current area and choose to visit other locations in the area that the driver is unfamiliar with. In such an example, the user device provides the option to pause or disable navigation. Such an option can be reenabled at any time.

In another embodiment, the system considers historical information in determining a viable route. In some embodiments, the determined viable route is not the route that traditional, turn-by-turn navigation would recommend. For example, the system determines that a route is a route or segment of a route that the user device has previously traversed without navigation, the system automatically engages (or stays engaged in) freedom navigation mode. In some embodiments, the system does so automatically. The system monitors the area around the user device and the routes conforming to the general direction the user device is travelling. In such an embodiment, the user device is configured to not engage micro navigation mode (or to provide notifications relating to micro navigation mode) unless and until the user device exceeds a maximum threshold distance. Such a system comprises a database of the user device's navigation and driving history. Such a database may be local (i.e., at the user device) or remote (i.e., cloud-based database).

In an exemplary embodiment of the present disclosure and with reference to FIG. 1A, user equipment device 105 requests navigation from mapping service 150. In some embodiments, mapping service 150 is implemented at user equipment device 105. In other embodiments, mapping application 150 is implemented remotely, for example, at a remote server (e.g., server 1350 as discussed with respect to FIG. 13). In some embodiments, mapping service 150 is implemented in response to instructions executed from non-transitory memory, for example, at user device 150 or at a remote server, as discussed herein. As illustrated, user equipment 105 receives a location to which user equipment 105 is to navigate. User equipment 105 further provides user selectable inputs to specify whether the navigation request is being made in freedom navigation mode or traditional turn by turn navigation mode. Once it receives the request, mapping service 150, at step 190, identifies routes from the location of user equipment 105 to the specified destination, as illustrated, to 1776 Liberty Way, Washington, DC.

Once mapping service 150 identifies the routes, mapping service 150 sends one or more of those routes to user equipment 105 and causes freedom navigation mode to display on user equipment 105 without directions. At step 191 mapping service 105 identifies a traffic event that impacts one or more of the routes at identified at step 190. In the event mapping service 150 identifies a traffic event, system 100 proceeds to step 192. At step 192, mapping service 150 determines whether user equipment device 105 is likely to travel on the route(s) that is to be impacted by the identified traffic event. System 100 may determine a likelihood based on the threshold and/or based on the user profile, which may include historical data. In the event that system 100 determines that user equipment 105 is likely to travel on the route, system 100 proceeds to step 193.

At step 193, system 100 causes user equipment device 105 to display the notification indicating that system 100 identified a traffic event that is likely to impact the route likely to be traveled by user equipment 105. As illustrated in FIG. 1A, the notification may be a graphical notification, for example, an exclamation point. In other embodiments, system 100 displays a text-based notification to user equipment 105. As illustrated, user equipment 105 displays a notification that an accident is identified. In some embodiments, system 100 may further display user-selectable options to engage micro navigation mode or continue in freedom navigation mode. System 100 then proceeds to step 194.

At step 194, system 100 determines whether a request for micro navigation has been received. In the event that it has, system 100 proceeds to step 195. At step 195, system 100 identifies one or more routes in which user equipment 105 may use to bypass the identified traffic event. At step 195, system 100 sends the micro navigation route or routes to be displayed at user device 105. In some embodiments, while in micro-navigation mode, turn-by-turn navigational directions are displayed at user equipment 105.

At step 196, system 100 determines whether user equipment 105 has successfully bypassed the identified traffic event. In the event that it has, system 100 proceeds to step 197, in which system 100 reengages freedom navigation mode. Once returned to freedom navigation mode, system 100 does not display turn-by-turn directions. In some embodiments, system 100 provides a user selectable input requesting system 100 to reengage freedom navigation mode. In other embodiments, system 100 automatically reengages freedom navigation mode. Such embodiments illustrating when and how system 100 switches between one or more of the disclosed navigational modes are discussed in more detail herein.

Figure 1B:
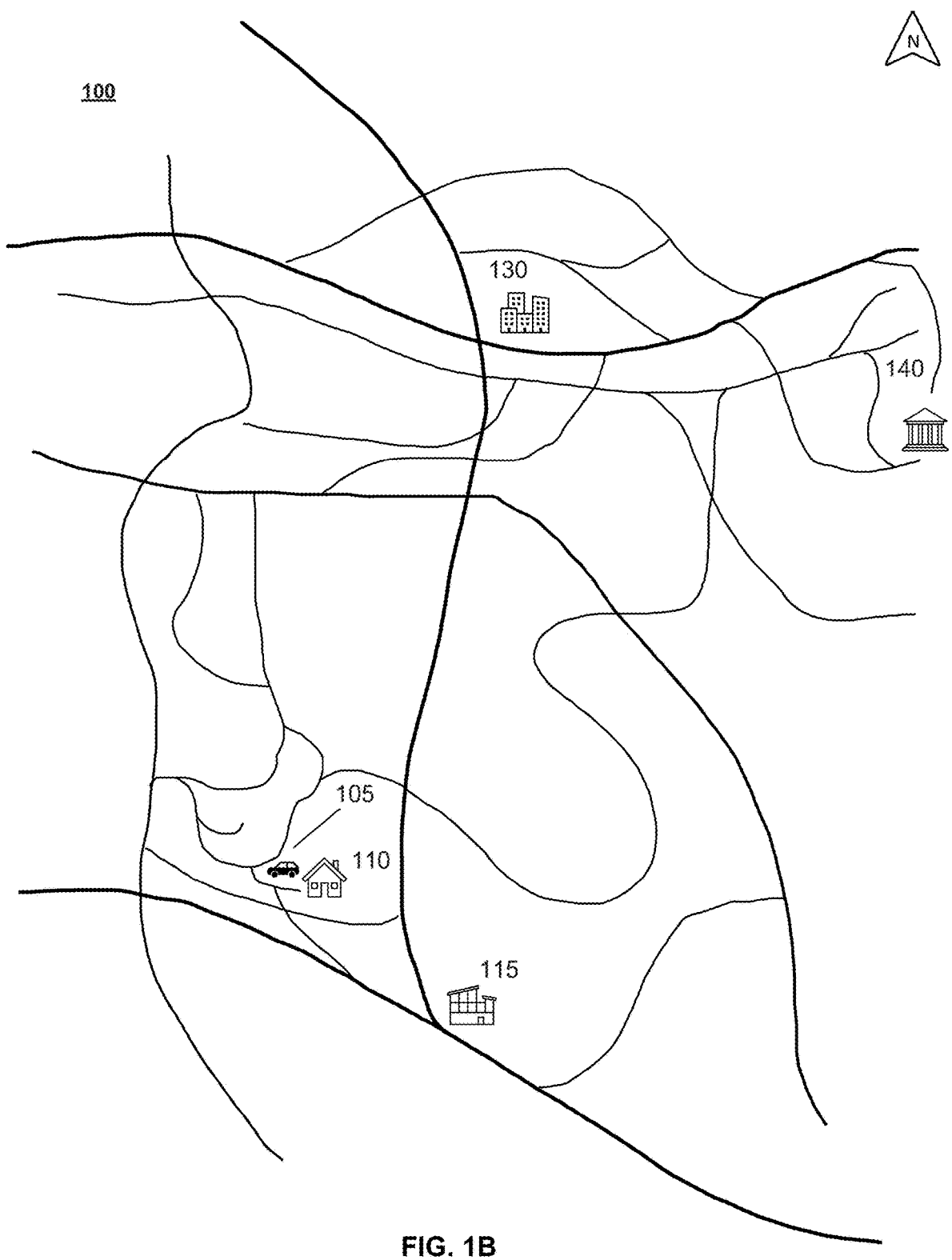

In an exemplary embodiment of the present disclosure and with reference to FIG. 1B, system 100 comprises vehicle 105, start location 110, city 130, and final destination 140. Is shown in FIG. 1B, there are multiple roadways with which vehicle 105 can travel from start location 110 to final destination 140. These roadways can consist of small, single lane roadways, for example, alleys and back roads. The roadways can further consist of streets, boulevards, major thoroughfares, highways, and interstate highways. As such, there are multiple ways in which vehicle 105 can make the journey from start location 110 to final destination 140. There may also exist points of interest along the journey from start location 110 to final destination 140. For example, town 115 and city 130 maybe points of interest or intermediate destinations between start location 110 and final destination 140.

Although the present disclosure may illustrate and describe vehicle 105 as a passenger car, any type of vehicle that uses navigation can be implemented as vehicle 105 without the parting from the contemplated embodiments. For example, vehicle 105 may be embodied by a passenger car, a passenger truck, a commercial truck, a van, an airplane, a train, a boat, or any other vehicle that uses or could benefit from using navigation. Additionally, embodiments of user devices or user equipment discussed herein (for example, those discussed with respect to 810, 910, 1010, 1110, 1210, 1310, 1410) may be interchangeably implemented as vehicle 105, 205, 305, 405, 505, 605, 705, and vice versa, without departing from the contemplated embodiments.

Although certain embodiments of the present disclosure illustrate and describe roads, any type of pathway that can be used for travel may be implemented, without departing from the contemplated embodiments. For example, any type of avenue, boulevard, drive, expressway, highway, lane, roadway, route, street, thoroughfare, track, trail, way, alley, by way, crossroad, drag, parkway, throughway, turnpike, or back street, maybe implemented without departing from the contemplated embodiments. Additionally, the foregoing non-limiting examples may be used interchangeably to describe any pathway that can be used for travel, without departing from the contemplated embodiments.

Figure 2:
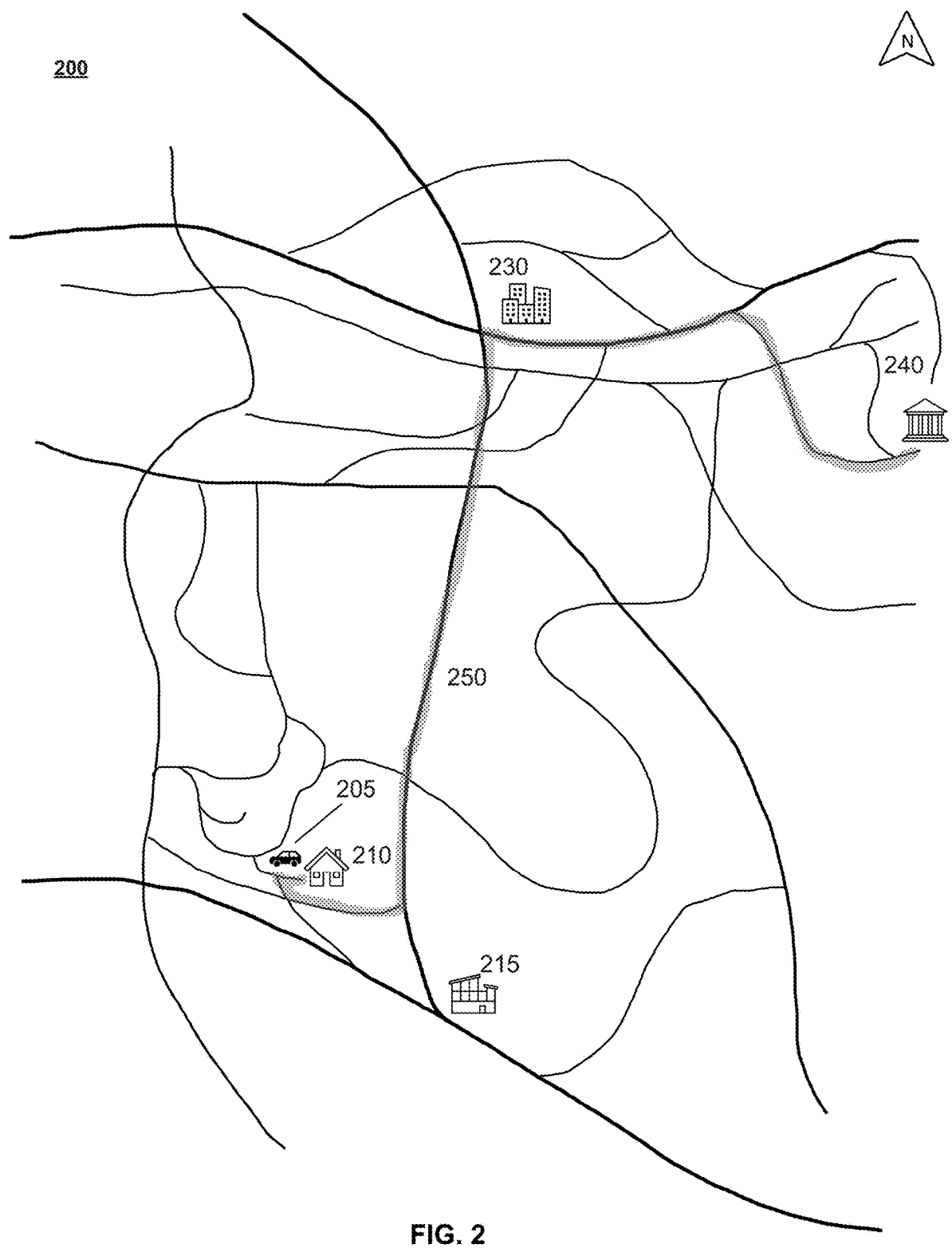
FIG. 2 depicts an illustrative diagram of a system for starting and ending navigation, in accordance with embodiments of the disclosure.

In another exemplary embodiment of the present disclosure and with reference to FIG. 2, system 200 comprises vehicle 205 start location 210, city 230, and final destination 240. In such an embodiment, vehicle 205 may employ a traditional navigation service to direct vehicle 205 from start location 210 to final destination 240. In such an embodiment, a traditional navigation service may be implemented that directs vehicle 205 along root 250 to arrive at final destination 240. In some embodiments, traditional navigation service typically directs vehicle 205 along a route that is well traveled and that allows vehicle 205 to traverse from start location 210 to final destination 240 in the shortest time possible. As illustrated in FIG. 2, route 250 guides vehicle 205 from start location 210 north along a thoroughfare to city 230, and along another thoroughfare in the eastern direction to ultimately arrive at final destination 240.

Figure 3A:
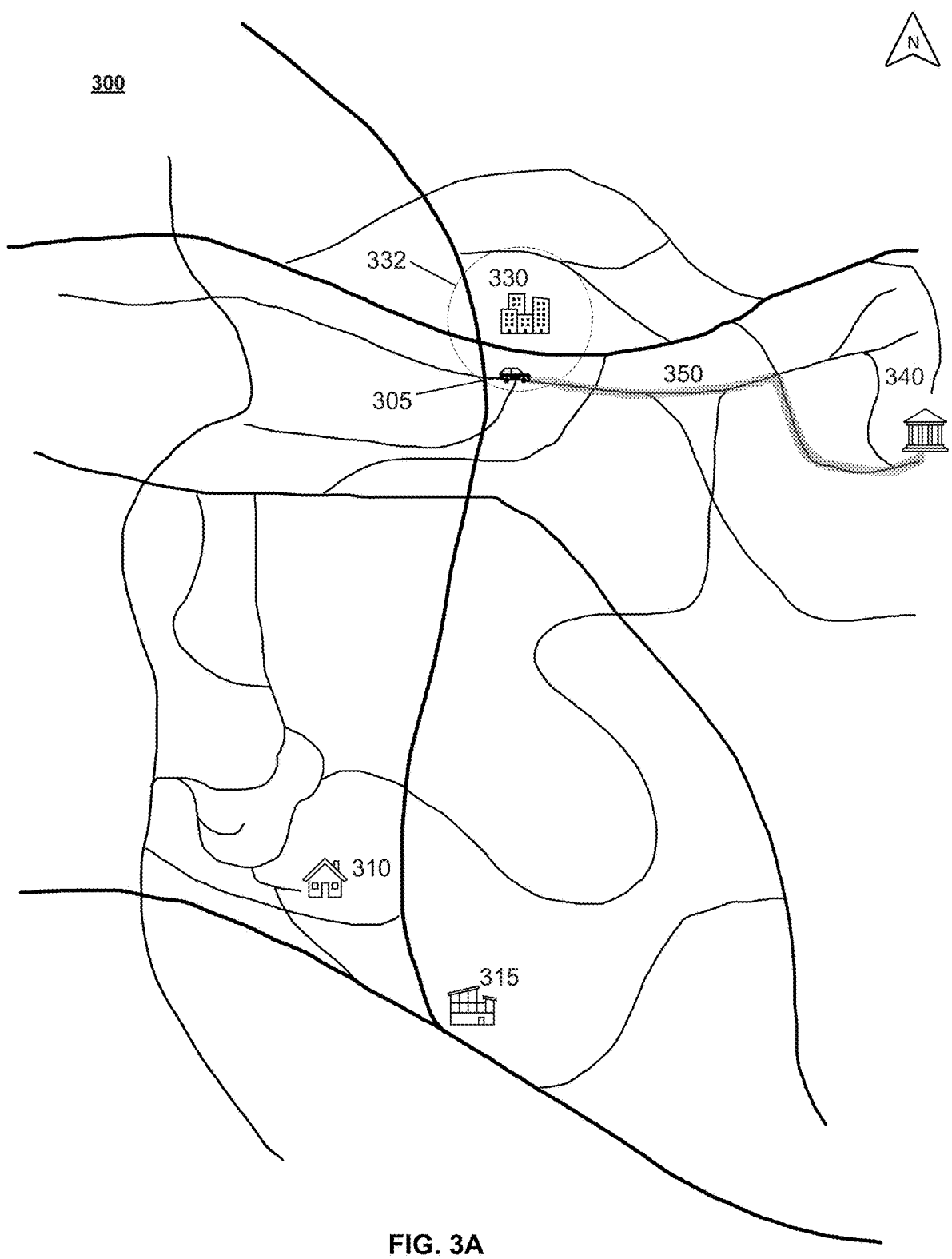
FIGS. 3A-3B depict illustrative diagrams of a system for starting and ending navigation, in accordance with embodiments of the disclosure.
Figure 3B:
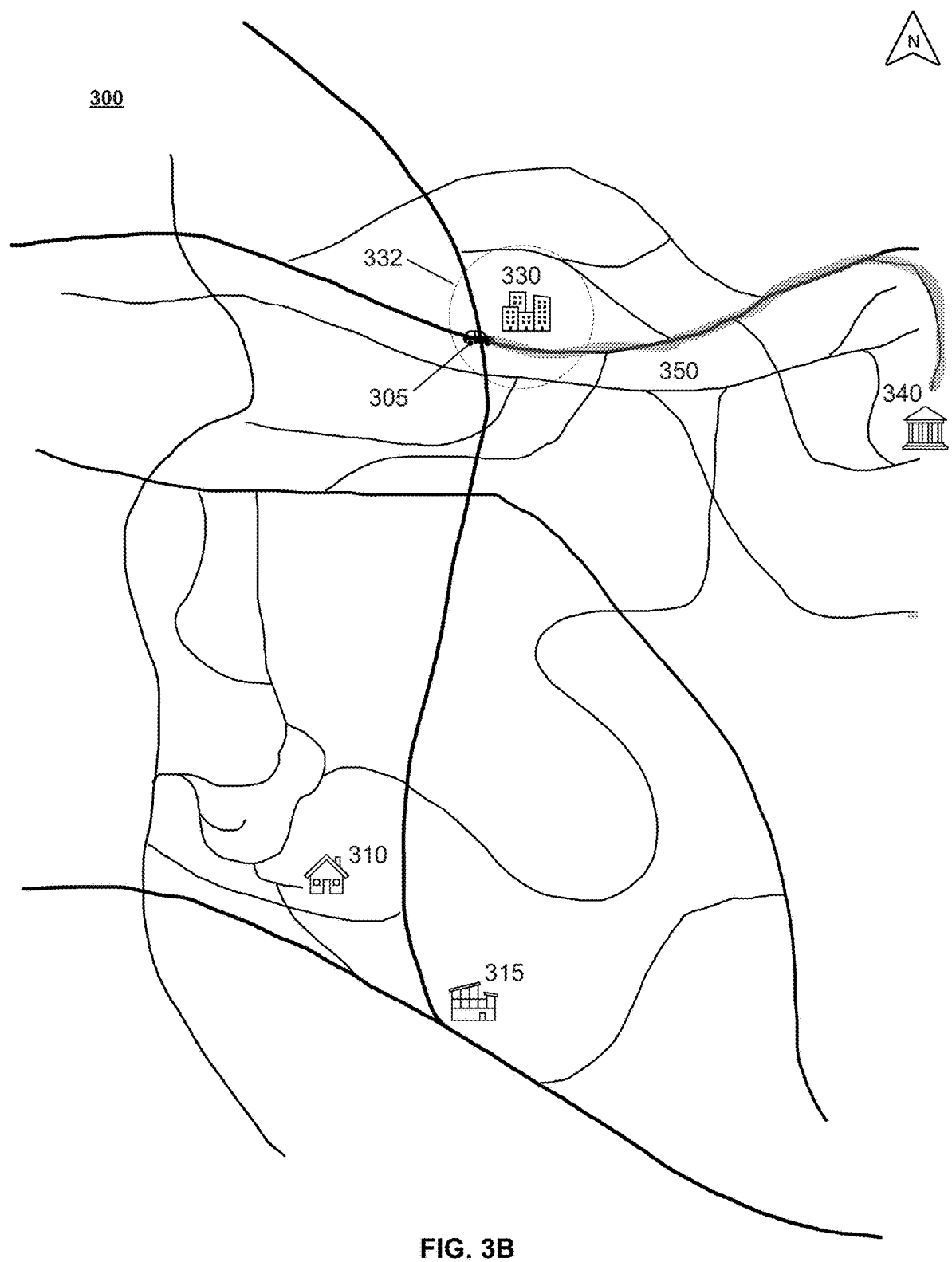

FIGS. 3A and 3B illustrate an exemplary embodiment of the present disclosure where traditional navigation is implemented at a predefined location that is different than vehicle's 305 start location. In such an embodiment, vehicle 305 begins its journey, for example, at start location 310. When vehicle 305 reaches a predetermined distance from city 330, system 300 begins traditional navigation from vehicle 305 location to final destination 340. Predetermined distance 332 from city 330 maybe user defined or, alternatively, dynamically adjusted based on conditions.

FIGS. 4A through 4E illustrate an exemplary embodiment of the present disclosure where freedom mode navigation is implemented to guide vehicle 405 from start location 410 to final destination 440. In such an embodiment, vehicle 405 begin its journey to final destination 440 from start location 410. Upon receiving a selection to implement freedom navigation mode, system 400 examines all possible routes that vehicle 405 could take to arrive at final destination 440. In some embodiments, system 400 limits its examination to a predefined distance from vehicle 405, for example, look ahead distance 407. In some embodiments, look ahead radius 407 can be a fixed distance from vehicle 405. In other embodiments, look ahead 407 maybe adjusted based on one or more parameters. For example, system 400 may adjust look ahead 407 based on the number of possible routes vehicle 405 can take, on traffic conditions, on time of day, on historical data, or any other parameter that may affect the root that vehicle 405 may take.

In some embodiments, system 400 made valuate every possible route between start location 410 and final destination 440. In other embodiments, system 400 evaluates all possible routes within look ahead radius 407, and then determine likely routes that vehicle 405 may take from the perimeter of look ahead radius 407 to final destination 440.

In some embodiments, look ahead area 407 is located such that its geometric center is centered on vehicle 405. In other embodiments, look ahead area 407 is located such that its geometric center is not centered on vehicle 405. In such an embodiment, system 400 may shift the geometric center of look ahead area 407 such that look ahead are 407 is positioned at a location between vehicle location 405 and final destination 440. Such an embodiment encourages system 400 to use computational resources more efficiently by focusing system's 400 determination of the possible routes for vehicle 405 in a direction that is more likely to achieve an optimized route between vehicle 405 and final destination 440.

Figure 4A:
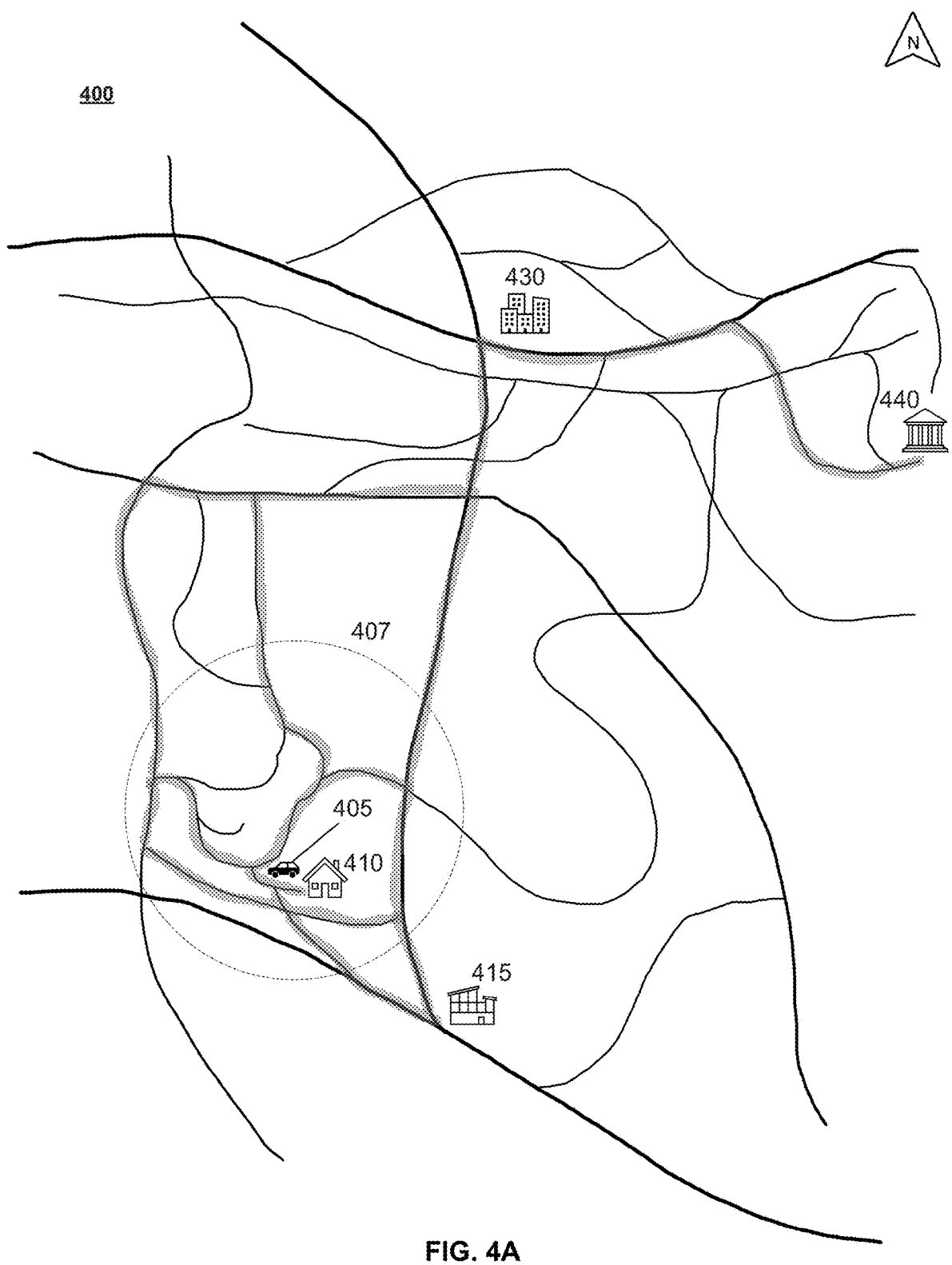
FIGS. 4A-4E depict illustrative diagrams of a system for starting and ending navigation, in accordance with embodiments of the disclosure.

In an exemplary embodiment and with reference to FIG. 4A, vehicle 405 begins a journey from start location 410 to final destination 440. In such an embodiment, system 400 implements freedom navigation mode with the start location as vehicle's 405 location and the end location as final destination 440. In such an embodiment, system 400 determines look ahead area 407 and determines all possible routes vehicle 405 can traverse to get from start location 410 to final destination 440 within look ahead area 407. During the journey from start location 410 to final destination 440, system 400 does not prompt vehicle 405 with turn-by-turn directions. Instead, system 400 monitors all possible routes within look ahead area 407 that vehicle 405 may take. In such an embodiment, system 400 monitors conditions to determine whether an event has occurred within look ahead area 407 that will delay vehicle 405 during the trip. In someone embodiments, system 400 considers whether adverse traffic events have occurred outside look ahead area 407 that will affect vehicle's 405 journey to final destination 440.

Figure 4B:
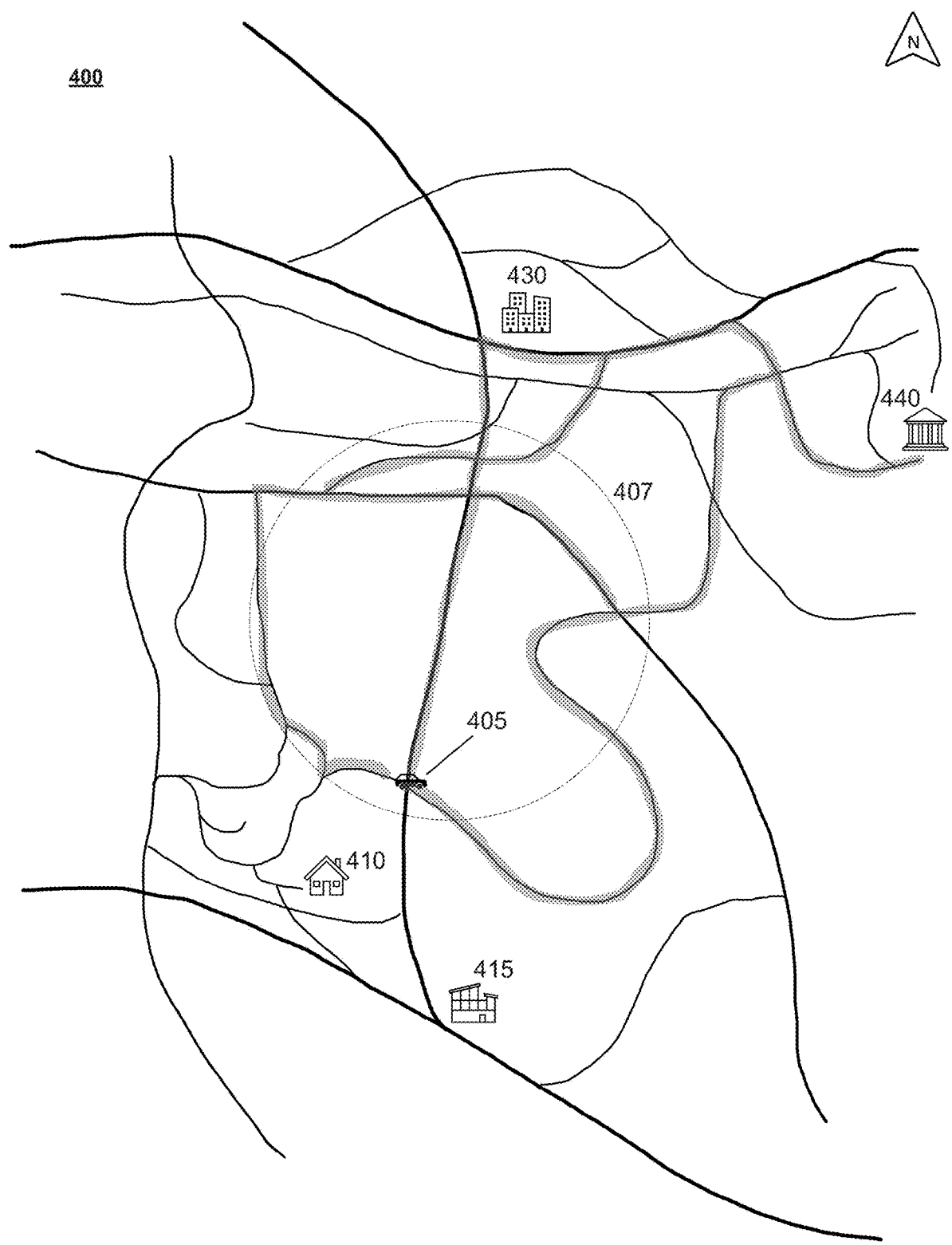

Continuing with the previous example and with reference to FIG. 4B, system 400 adjust the size and orientation of look ahead area 407 as vehicle 405 continues its trip from start location 410 to final destination 440. As illustrated, system 400 enlarged the radius of look ahead area 407. System 400 may enlarge or reduce the radius of the look ahead area 407 based on various factors. For example, system 400 may enlarge the radius of look ahead area 407 where there are fewer possible routes that vehicle 405 may take. Conversely, system 400 may reduce the radius of look ahead area 407 if there are many routes vehicle 405 may traverse. In other embodiments, the radius of look ahead area 407 may remain constant during vehicle's 405 trip from start location 410 to final destination 440.

Figure 4C:
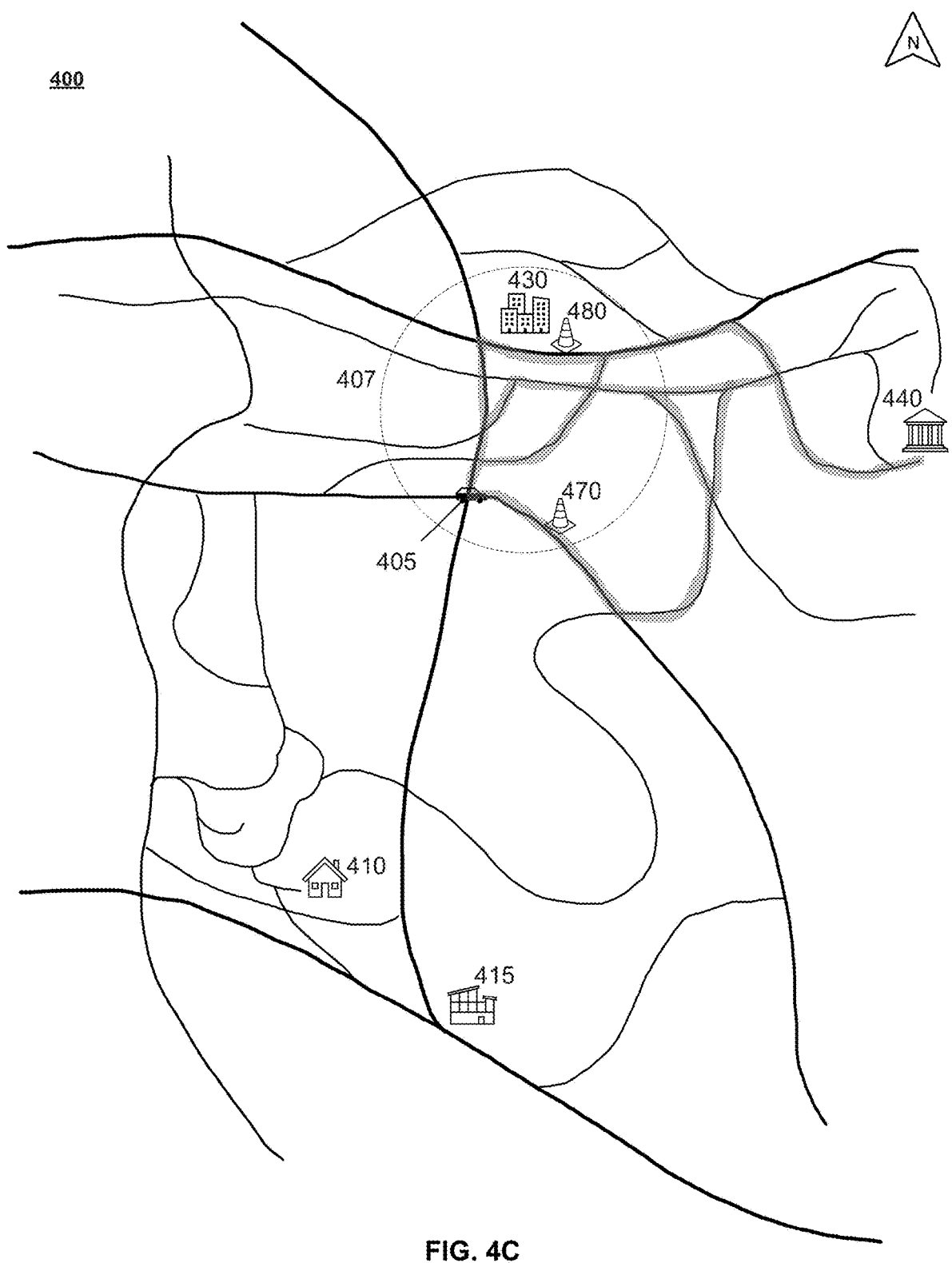

Continuing with the previous example and with reference to FIG. 4C, vehicle 405 continues its trip from start location 410 to final destination 440. System 400 determines that traffic event 470 and traffic event 480 are present along some of the possible routes that vehicle 405 may traverse from its current location to final destination 440. In an exemplary embodiment, system 400 provides a notification that traffic event 470 and/or traffic event 480 may impact vehicle's 405 trip to final destination 440. In such an embodiment, system 400 may display a prompt on user equipment, for example, a navigation system implemented within vehicle 405, that traffic event 470 and traffic event 480 may impact vehicle's 405 trip. In other embodiments, system 400 displays a prompt on user equipment to engage turn-by-turn navigation so as to avoid traffic event 470 and traffic event 480. In other embodiments, system 400 displays a notification regarding traffic event 470 and traffic event 480 without supplying turn-by-turn navigation. In other embodiments, system 400 displays optional routes between vehicle's 405 location and final destination 440 that avoid areas potentially impacted by traffic event 470 and/or traffic event 480. Traffic event 470 and/or traffic event 480 represent any type of event that may impact vehicle's 405 travel to final destination 440. For example, traffic event 470 and/or traffic event 480 maybe a construction zone, an accident, a police checkpoint, a speed trap, a road closure, adverse weather conditions, or debris being present in the roadway.

Figure 4D:
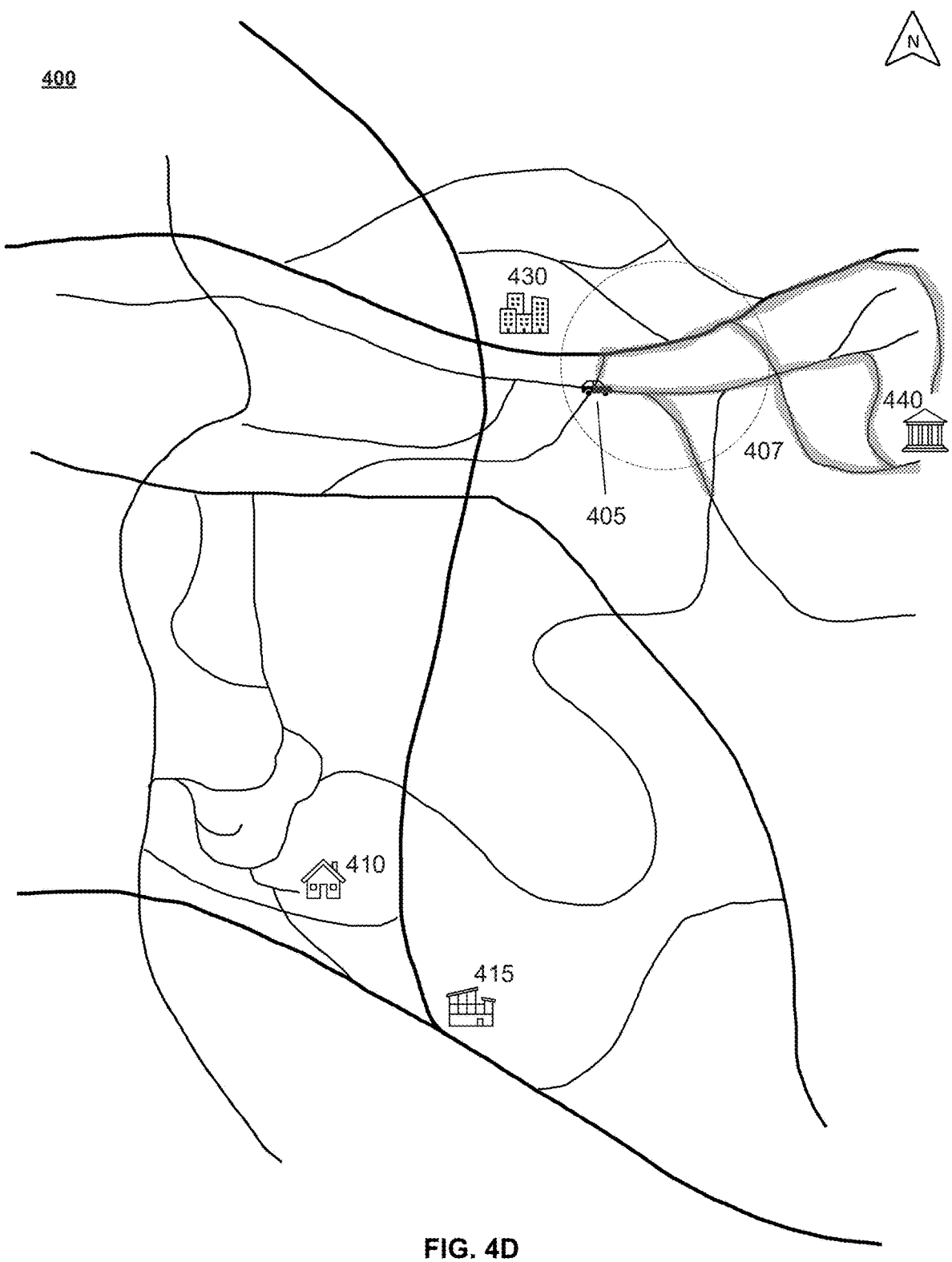

Continuing with the previous example and with reference to FIG. 4D, vehicle 405 continues on its journey to final destination 440. As illustrated, once vehicle 405 passes the identified traffic events (e.g., traffic event 470 and traffic event 480), system 400 resumes freedom navigation mode. In such an embodiment, system 400 resumes examining routes within look ahead area 407 to identify potential traffic events that may impact vehicle's 405 travel to final destination 440. In other embodiments, system 400 continues to supply turn-by-turn navigation directing vehicle 405 to final destination 440.

Figure 4E:
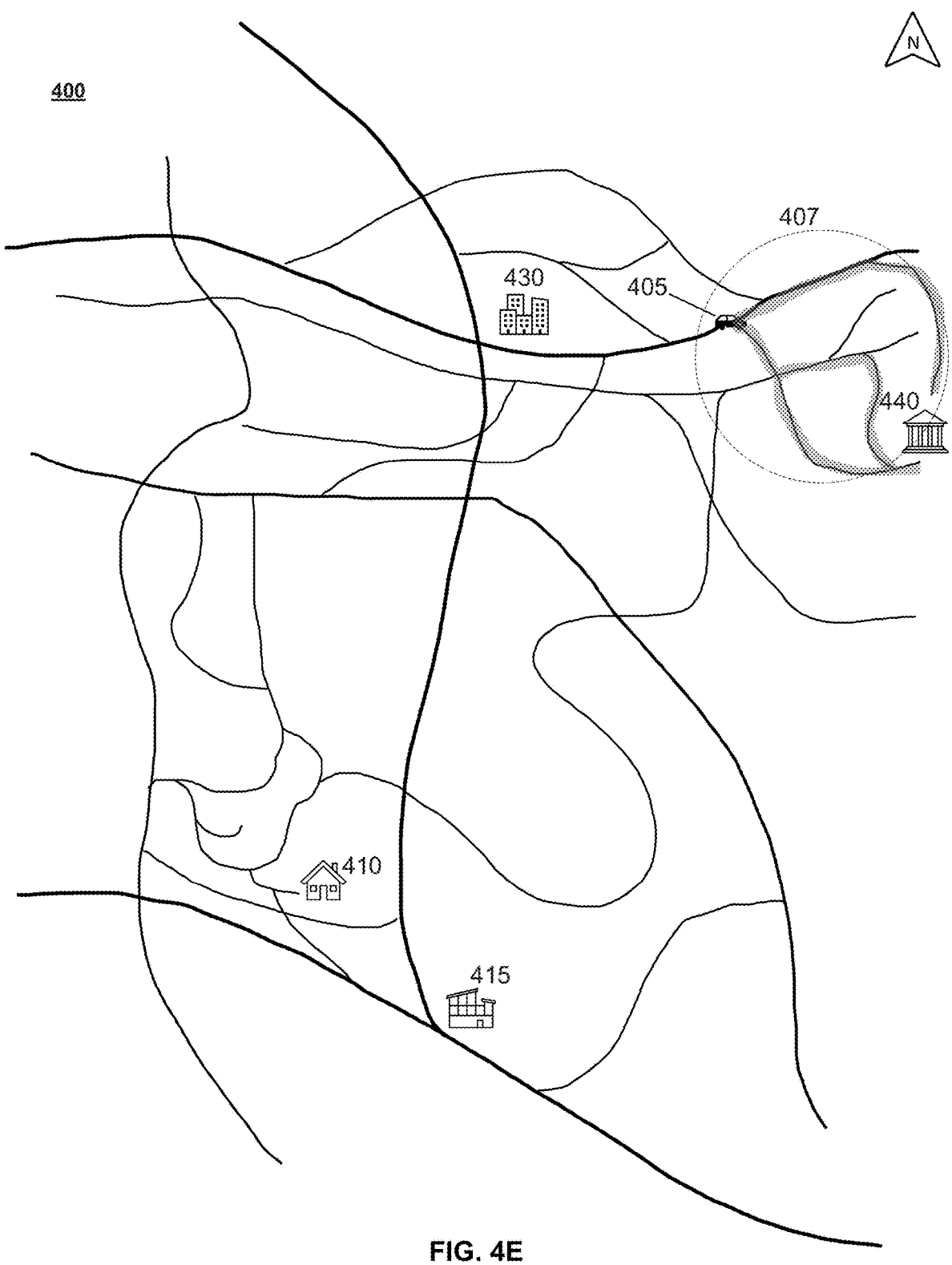

Continuing with the previous example and with reference to FIG. 4E, vehicle 405 continues on its journey to final destination 440. In such an embodiment, look ahead area 407 encompasses final destination 440. In such an embodiment, system 400 may refrain from further moving look ahead area 407. In such an embodiment, system 400 may reduce the radius of look ahead area 407 such that it encompasses vehicle 405 and final destination 440 until vehicle 405 reaches final destination 440. When vehicle 405 reaches destination 440, system 400 may automatically disengage freedom mode navigation. In other embodiments, system 400 displays a prompt (e.g., on user equipment) to end navigation.

Figure 5:
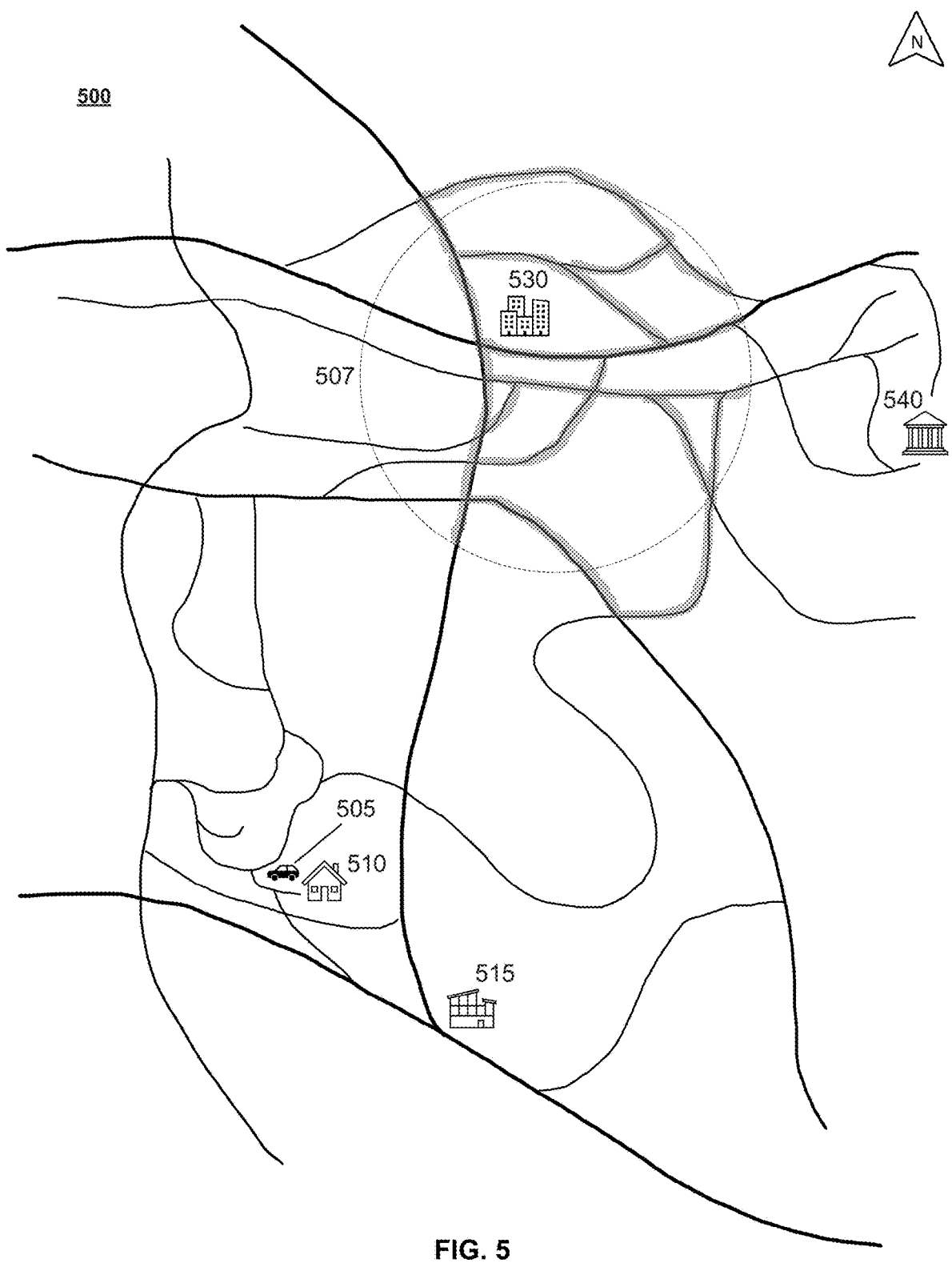
FIG. 5 depicts an illustrative diagram of a system for starting and ending navigation, in accordance with embodiments of the disclosure.

In another exemplary embodiment of the present exposure and with reference to FIG. 5, vehicle 505 traverses the roadway from start location 510 to final destination 440. In such an embodiment, system 500 examines all possible routes vehicle 505 may take from start location 510 to final destination 540. As illustrated, system 500 determines that all possible routes that vehicle 505 can take include a contained area (e.g., a bottleneck). In such an embodiment, system 500 determines look ahead area 507 and situates it such that it encompasses all possible routes in the contained area. System 500 examines the roadways within look ahead area 507 to determine whether any traffic events have occurred in look ahead area 507 that may impact vehicle's 505 trip from start location 510 to final destination 540. In such an embodiment, system 500 does not move look ahead area 507. In other embodiments, system 500 modifies look ahead area 507. For example, system 500 may enlarge or reduce the radius of look ahead area 507 and/or move its geographic center.

Figure 6A:
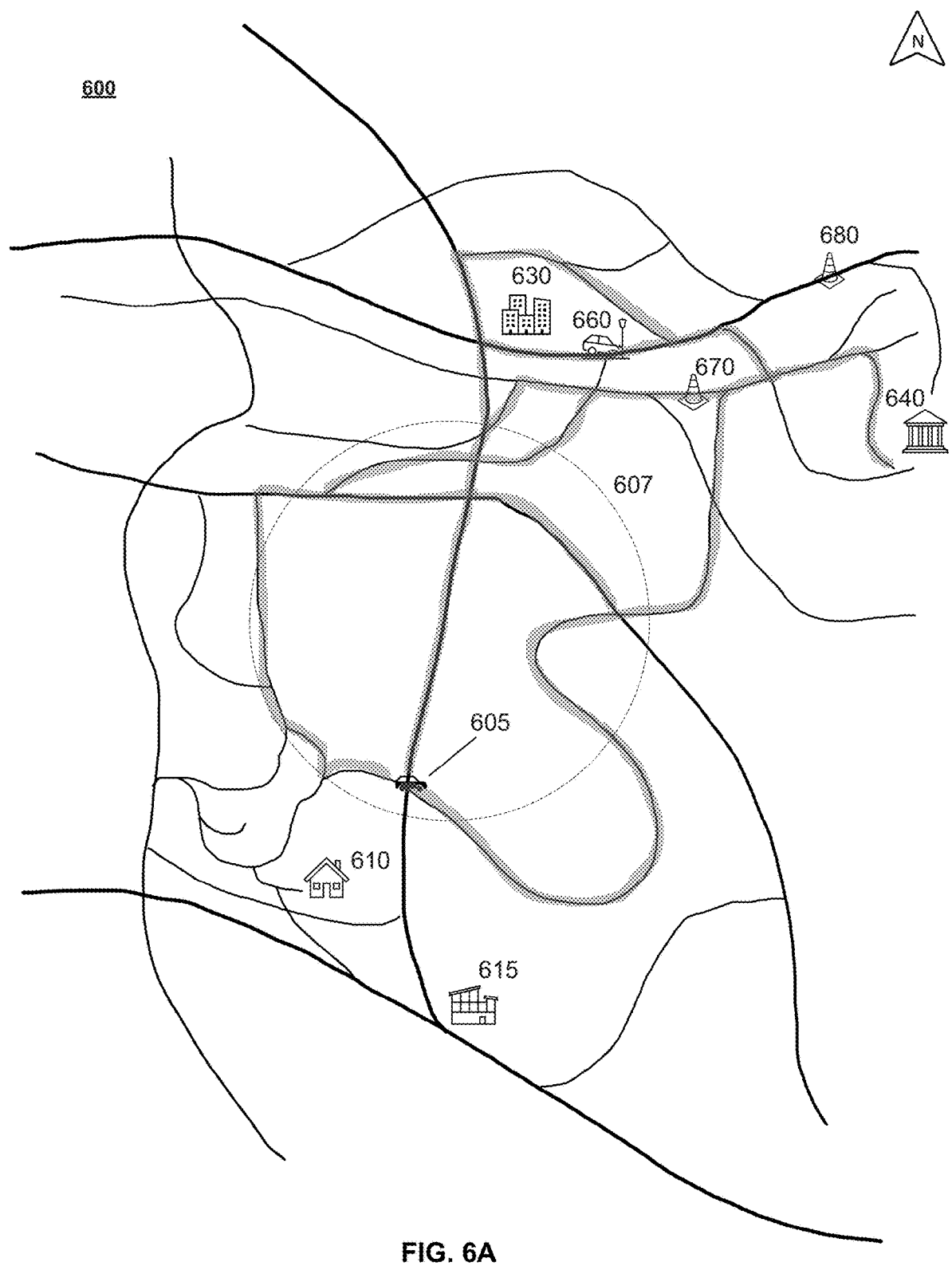
FIGS. 6A-6B depict illustrative diagrams of a system for starting and ending navigation, in accordance with embodiments of the disclosure.
Figure 6B:
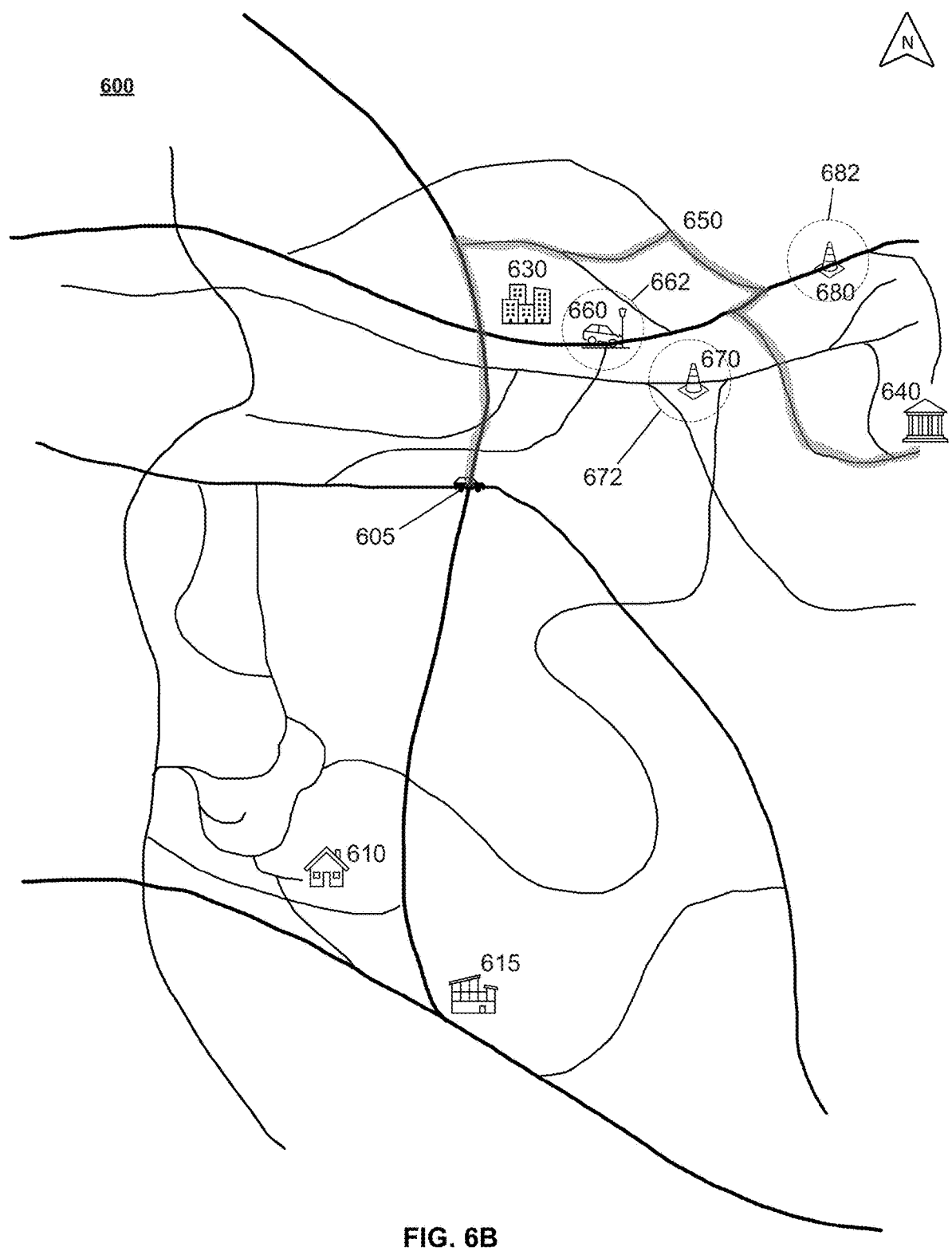

In another exemplary embodiment of the present disclosure with reference to FIG. 6B, system 600 operates in freedom navigation mode, examining vehicle's 605 location and potential routes to final destination 640. As illustrated, system 600 the identifies traffic event 660, traffic event 670, and traffic event 680. As illustrated, traffic event 660 is embodied by a car accident and traffic events 670, 680 are embodied by construction zones. In such an embodiment, system 600 displays a prompt on user equipment, for example, a navigation device implemented within vehicle 605, indicating the presence of traffic events 660, 670, 680. System 600 prompts implementation of turn-by-turn navigation mode to avoid traffic events 660, 670, 680. Notably, in the illustrated embodiment, traffic events 660, 670, 680 are outside of lookahead area 607. In such an embodiment, system 600 receives traffic information from an external source. For example, system 600 may receive information from traffic monitoring services. In this way, system 600 provides updates to vehicle 605 regarding traffic events that may impact vehicle's 605 route to final destination 640.

Continuing with the previous example and with reference to FIG. 6B system 600 implements turn-by-turn navigation to direct vehicle 605 2 destination 640 while voiding traffic event 660, 670, 680. In such an embodiment, system 600 displays a prompt on user equipment, for example, navigation system implemented at vehicle 605 indicating whether system 600 should engage in a particular navigation mode. As illustrated, system 600 implements turn-by-turn navigation to direct vehicle 605 to final destination 640 such that it avoids traffic events. In some embodiments, system 600 further avoids a predefined area around traffic events so as to avoid potential traffic that may result from the traffic events. For example, to avoid traffic event 660, system 600 avoids routes that include roadways that pass through traffic event area 662. Similarly, system 600 avoids roadways that fall within traffic event area 672 and traffic event 682 so as to avoid traffic that results from traffic event 670 and traffic event 680, respectively.

Figure 7:
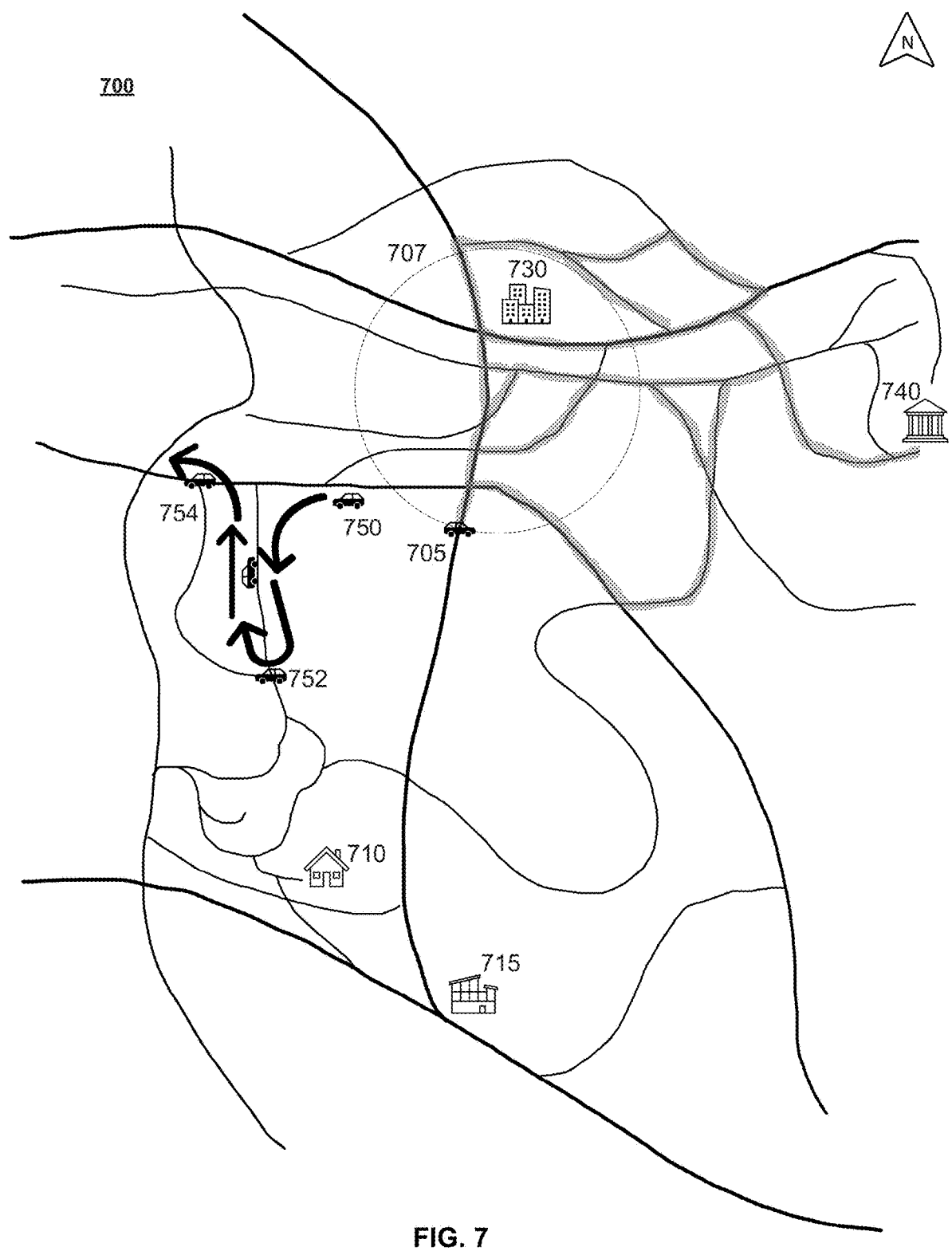
FIG. 7 depicts an illustrative diagram of a system for starting and ending navigation, in accordance with embodiments of the disclosure.

In another exemplary embodiment of the present disclosure and with reference to FIG. 7, system 700 determines that vehicle 705 might be lost. As illustrated, system 700 is engaged in freedom navigation mode to direct vehicle 705 to final destination 740. However, vehicle 705 sues a route that is not one of the determined routes that would lead vehicle 705 to final destination 740. For example, system 700 determines that vehicle 705 made a left turn and is at position 750. System 700 further determines that vehicle 705 makes a U-turn at position 752 and another left turn at position 754, both of which are determined to not be one of the routes that would lead vehicle 705 to final destination 740. System 700 determines that position 752, 750, and 754 are not any of the possible routes that vehicle 705 could take to arrive at final destination 740, indicating that vehicle 705 is lost. Additionally, system 700 detects vehicle's 705 U-turn at position 752, further indicating that it is lost. In some embodiments, system 700 displays a notification on user equipment, for example, a navigation system implemented within vehicle 705, and inquires whether system 700 should supply turn-by-turn navigation. In other embodiments, system 700 automatically engages turn-by-turn navigation to direct vehicle 705 to a route that leads to final destination 740. In this way, system 700 determines whether vehicle 705 is lost and provides the ability supply corrective turn-by-turn navigation.

Figure 8:
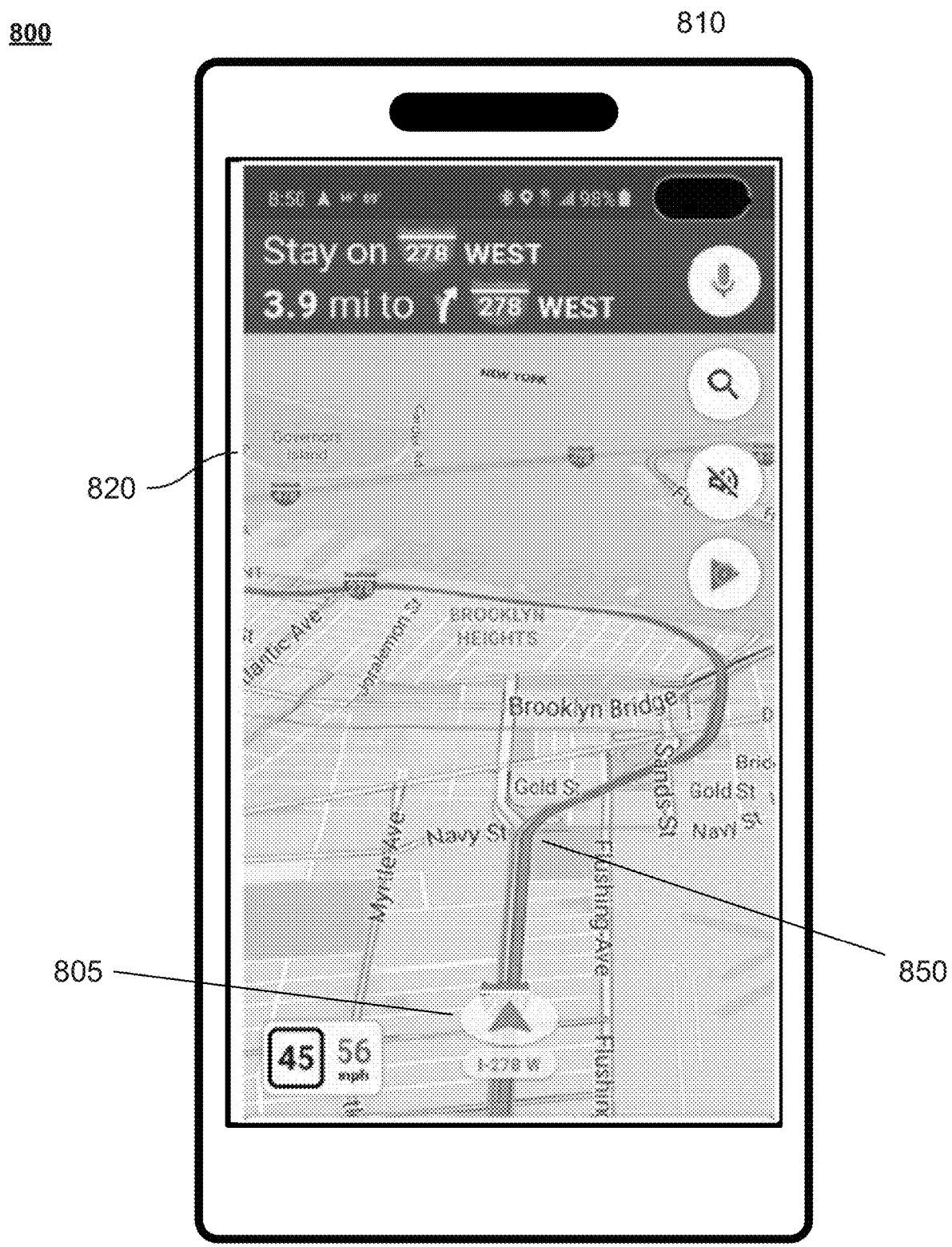
FIG. 8 depicts an illustrative diagram of a user interface implemented with an exemplary system for starting and ending navigation, in accordance with embodiments of the disclosure.

In another exemplary embodiment of the present disclosure and when it's reference to FIG. 8, system 800 displays user interface 820 on user equipment 810. In an embodiment, user interface 820 displays a map of the relevant area around vehicle, for example, the apple 705. User interface 820 includes in vehicle indicator 805 that indicates the location of the vehicle relative to the map displayed on user interface 820. In some embodiments, user interface 820 includes a roadway indicator 850 that indicates a route determined by system 800. Although the systems and methods described herein may be illustrated in the context of a cellular telephone, any mobile device maybe implemented as a user device (e.g., user equipment 810) without departing from the contemplated embodiments. For example, user equipment 810 maybe embodied by a cellular telephone, a tablet, a laptop computer, a computer, a smartwatch (or other wearable technological device), a standalone navigation system, or a navigation system attached to, or built in, a vehicle.

Figure 9:
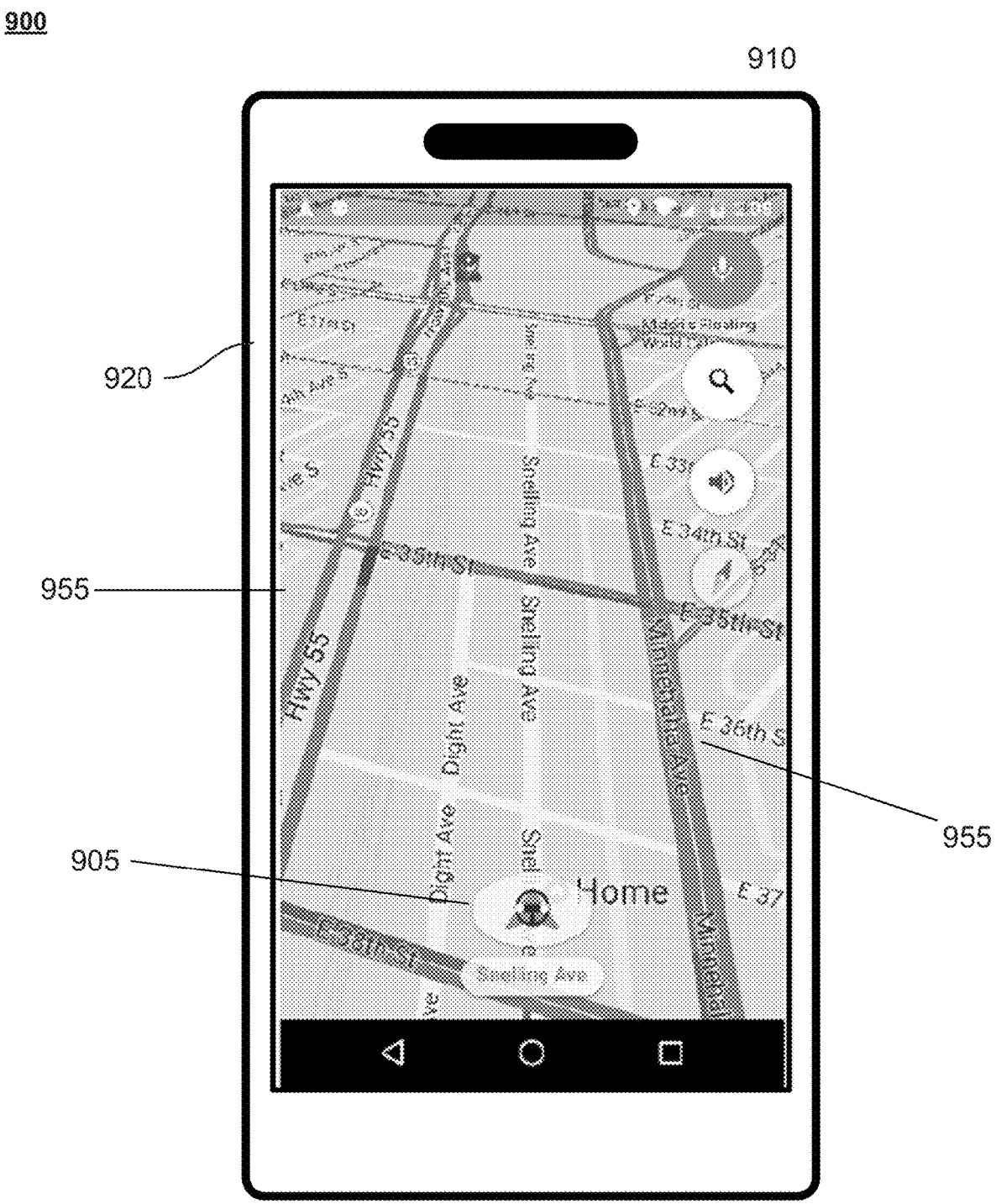
FIG. 9 depicts an illustrative diagram of a user interface implemented with an exemplary system for starting and ending navigation, in accordance with embodiments of the disclosure.

In another exemplary embodiment of the present disclosure and with reference to FIG. 9, system 900 includes user interface 920 displayed on user equipment 910. User interface 920 displays a map and includes vehicle indicator 905 that indicates the location of the user equipment 910 relative to the map displayed on user interface 920. User interface 920 may further include traffic indicators 955 that indicate traffic flow on the respective roadways. In some embodiments, user interface 920 includes an indicator that indicates system 900 is being operated in a particular mode. As illustrated in FIG. 9, system 900 is operated in freedom navigation mode, as indicated by the steering wheel included with indicator 905, and further indicated by the absence of turn-by-turn navigation being displayed in conjunction with the map on user interface 920. Although the driving mode maybe indicated by indicator 905 or the presence or absence of turn-by-turn navigation being displayed and user interface 920, any type of indicator maybe implemented without departing from the contemplated embodiments. For example, user interface 920 may include a text-based indicator that indicates which navigation mode is currently being implemented. In some embodiments, user interface 920 further include options user selectable options to switch to a particular navigation mode. In other embodiments, the navigational modes maybe switched by an auditory or verbal user input.

Figure 10A:
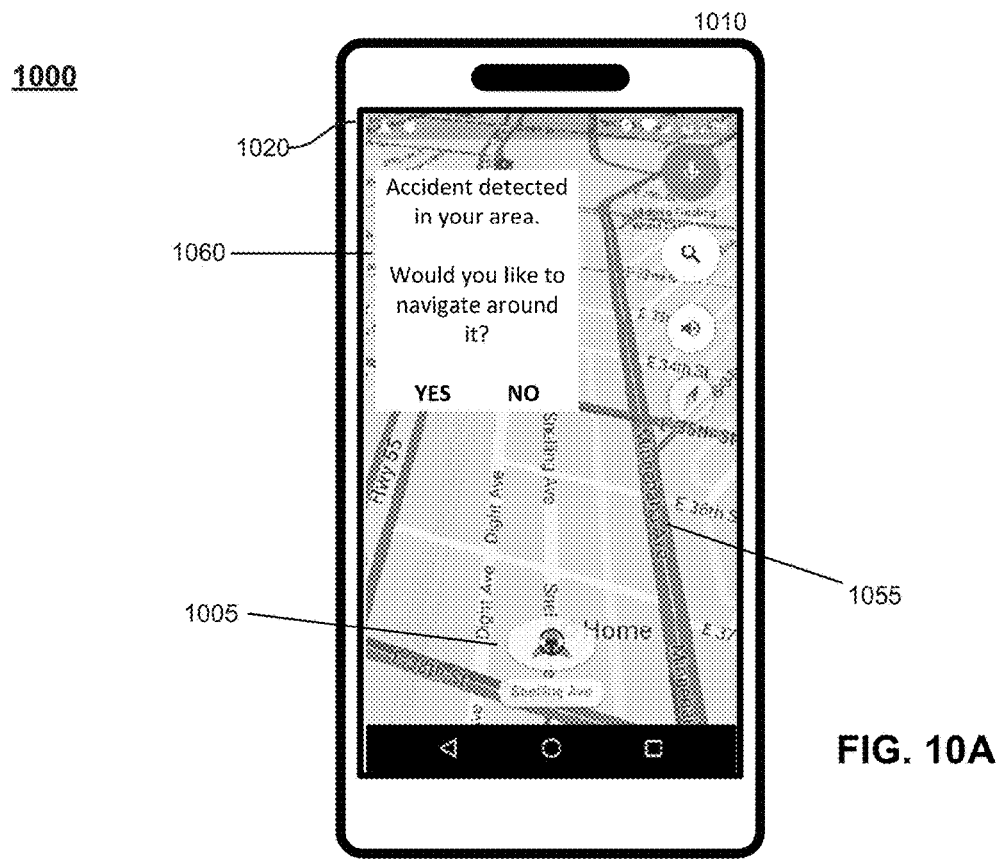
FIGS. 10A-10B depict illustrative diagrams of a user interface implemented with an exemplary system for starting and ending navigation, in accordance with embodiments of the disclosure.

In another exemplary embodiment of the present disclosure and with reference to FIG. 10A, system 1000 is implemented on user device 1010. As illustrated, system 1000 includes user interface 1020 and indicator 1005. User interface 1020 may also include navigational information such as traffic indicator 1055. In an embodiment, while operating in freedom navigation mode, system 1000 may identify an accident or other traffic event occurring within the vicinity of user device 1010. As illustrated, user interface 1020 includes notification 1060 that displays a notification indicating that an accident has been identified in the vicinity. Notification 1060 includes a user selectable option to provide navigation services to route around the identified traffic event, e.g., the accident. In an embodiment, the navigational modes may be switched between, for example, freedom navigation mode and turn-by-turn navigation mode by selecting "YES" displayed on notification 1060. In other embodiments, the user selectable modes may be switched based on an auditory or verbal input, for example, stating "navigate me around the accident" aloud.

Figure 10B:
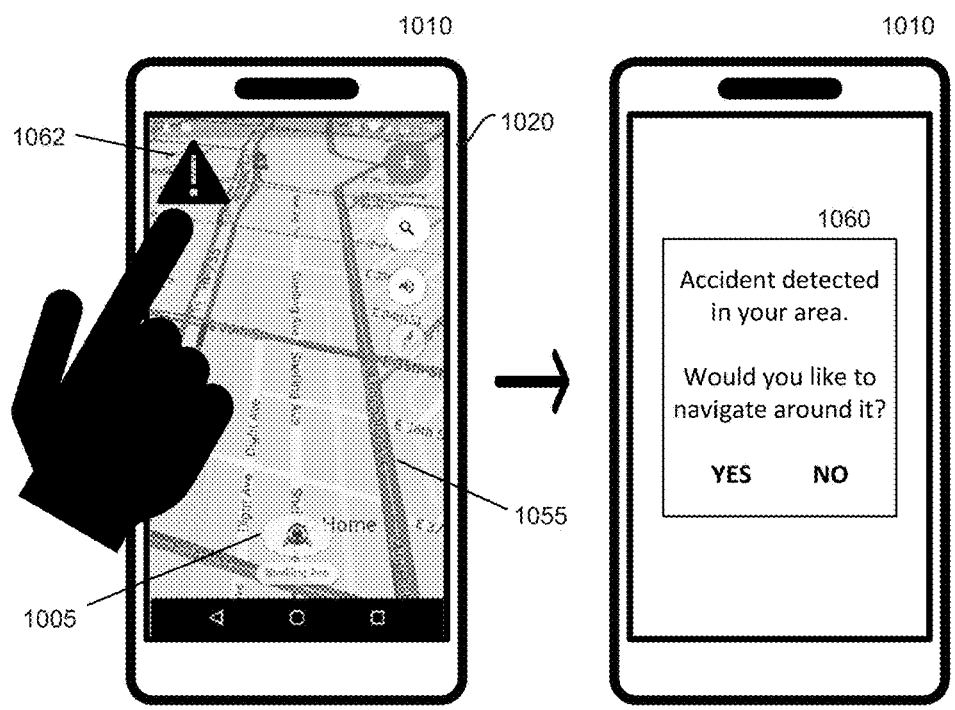

In another exemplary embodiment of the present disclosure and with reference to FIG. 10B, system 1000 implemented on user equipment 1010. In some embodiments, user equipment 1010 displays user interface 1020. User interface 1020 includes location indicator 1005 that indicates the location of user device equipment 1010 relative to a map displayed on user interface 1020, as illustrated in FIG. 10B. In some embodiments, user interface 1020 includes event indicator 1062. Although event indicator 1062 is shown as an exclamation point, any graphical or text-based indicator may be implemented without departing from the contemplated embodiments. As illustrated in FIG. 10B, event indicator 1062 is user selectable and, when selected, causes user interface 1020 to display text-based notification 1060. Notification 1060 includes a message that indicates an accident has been identified near the location of user equipment 1010 and provides user selectable inputs to engage turn-by-turn navigation, directing user equipment 1010 around the identified event. In some embodiments, location indicator 1005 includes an additional indicator related the navigational mode being implemented. As illustrated in FIG. 10, system 1000 is implemented in freedom navigation mode.

Figure 11A:
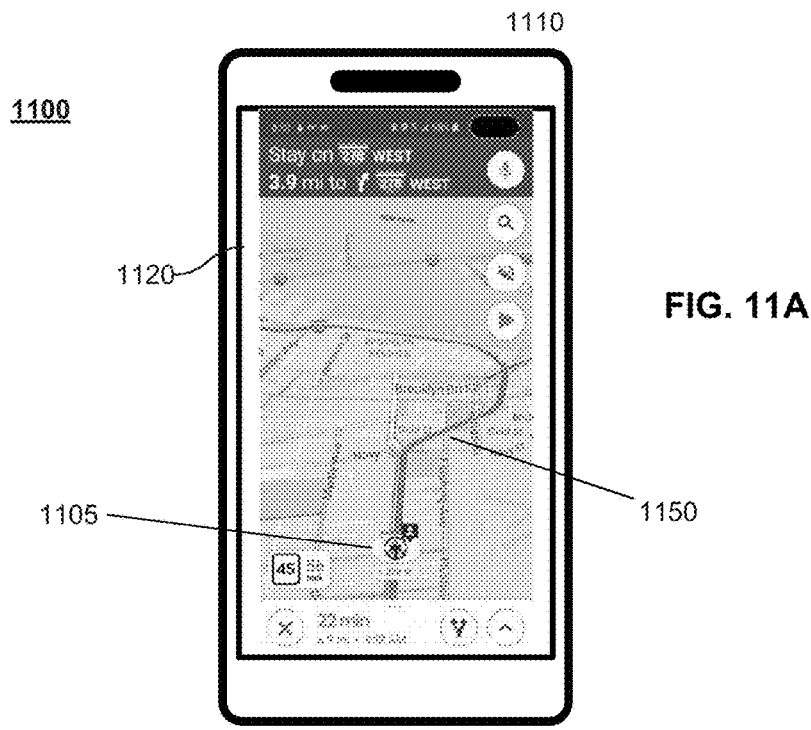
FIGS. 11A-11B depict illustrative diagrams of a user interface implemented with an exemplary system for starting and ending navigation, in accordance with embodiments of the disclosure.
Figure 11B:
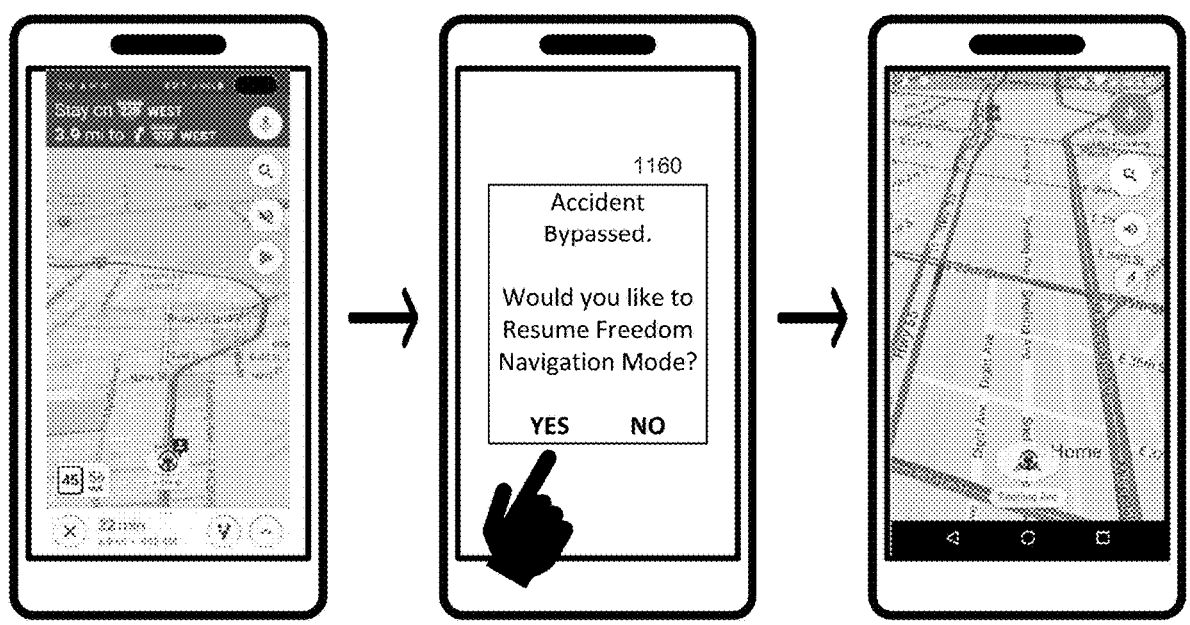

In another exemplary embodiment of the present disclosure and with reference to FIG. 11A, system 1100 is implemented on user equipment 1110 and displays user interface 1120, having indicator 1105 and turn-by-turn direction 1150. As illustrated in FIG. 11A, system 1100 is implemented in micro navigation mode. In such an embodiment, system 1100 was previously operated in, e.g., freedom navigation mode and identified a traffic event. In response to identifying the event, system 1100 displays a notification with user-selectable inputs that switch system 1100 to operate in micro navigation mode. For example, the systems and methods discussed with respect to FIGS. 10-11 presented the option to provide navigation to circumvent a identified event traffic event. User interface 1120 illustrates an exemplary user interface after system 1100 is directed to navigate user equipment 1110 around the traffic event. In such an embodiment, user equipment 1110 displays turn-by-turn navigation on user interface 1120 until user equipment 1110 has successfully navigated around the identified traffic event. In some embodiments, system 1100 automatically disengages micro navigation mode and returns to, for example, freedom navigation mode after user equipment 1110 has successfully bypassed the identified traffic event. In other embodiments, system 1100 provides an indicator noting that user equipment 1110 has successfully navigated around the identified traffic event and displayed an option to resume freedom navigation mode or, alternatively, remain and turn-by-turn navigation mode, for example, as illustrated in FIG. 11B. In some embodiments, system 1100 may display turn-by-turn navigation until user equipment 1110 arrives at the final destination. In other embodiments, system 1100 engages freedom navigation mode until either user equipment 1110 is directed to discontinue freedom navigation mode or, alternatively, system 1100 automatically engages freedom navigation mode.

Figure 12:
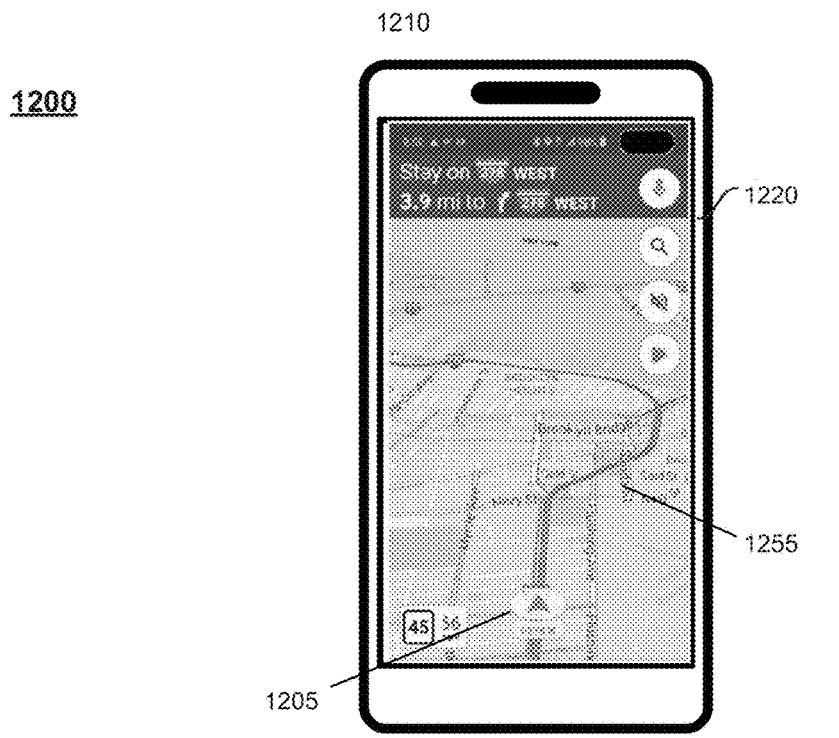
FIG. 12 depicts an illustrative diagram of a user interface implemented with an exemplary system for starting and ending navigation, in accordance with embodiments of the disclosure.
Figure 12:
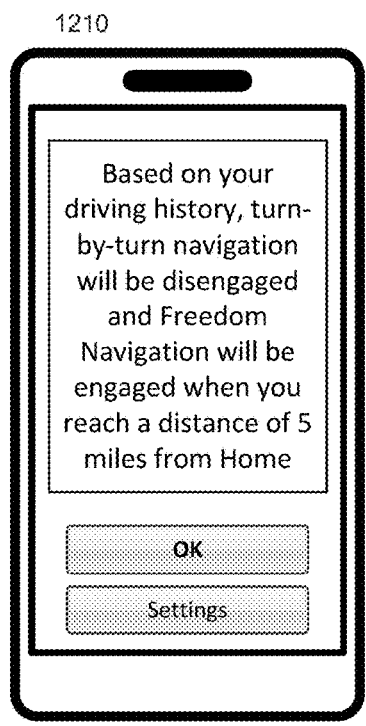
Figure 12:
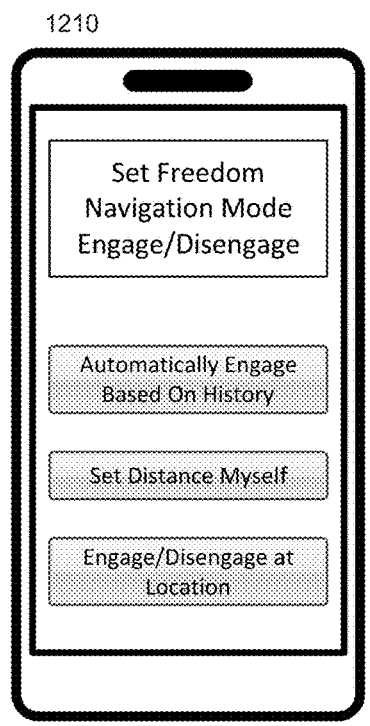

In another exemplary embodiment of the present disclosure and with reference to FIG. 12, system 1200 engages and disengages various navigational nodes. As illustrated, system 1200 includes user interface 1220 and indicator 1205. User interface 1220 may also include navigational information such as traffic indicator 1255. In an embodiment, once user device 1205 has successfully bypassed an identified traffic event, for example, as discussed with FIGS. 10 and 11, system 1200 disengages micro navigation mode and resumes freedom navigation mode. In an embodiment, system 1200 automatically disengages turn-by-turn navigation when user device 1210 reaches a distance of, e.g., five miles from a specified location, for example, home. In another embodiment, system 1200 automatically engages and/or disengages freedom navigation mode based on historical data. For example, system 1200 automatically engages freedom navigation mode once user device 1210 has reached an area that user device 1210 has previously encountered. Conversely, system 1200 may automatically disengage freedom navigation mode and engage turn-by-turn navigational directions once user device 1210 has reached an area that it has not encountered before. In another embodiment, the distance at which freedom navigation mode is engaged and/or disengaged is user selectable based on, for example, a distance to a specified point or location. In other embodiments, system 1200 engages and/or disengages freedom navigation mode and/or micro navigation mode based on a selected location. For example, user device 1210 specifies an intermediate location at which freedom navigation mode is disengaged and turn-by-turn navigation mode is engaged. In another example, turn-by-turn navigational directions are disengaged and freedom navigation mode is engaged at a specified location. In this way, the point at which system 1200 switches between freedom navigation mode, micro navigation mode, and traditional turn-by-turn navigation mode is selected.

In further embodiments, system 1200 provides user selectable geographic areas in which certain modes are to be engaged and/or disengaged. For example, user device 1210 may specify a particular geographic area or region in which system 1200 automatically engages freedom navigation mode. Conversely, system 1200 provides user selectable options so that user device 1210 selects a particular geographic region in which turn-by-turn navigation mode is always engaged, i.e., geofencing. In this way, this 1200 is user configurable to specify which navigational modes are automatically applied to which geographic regions.

Figure 13:
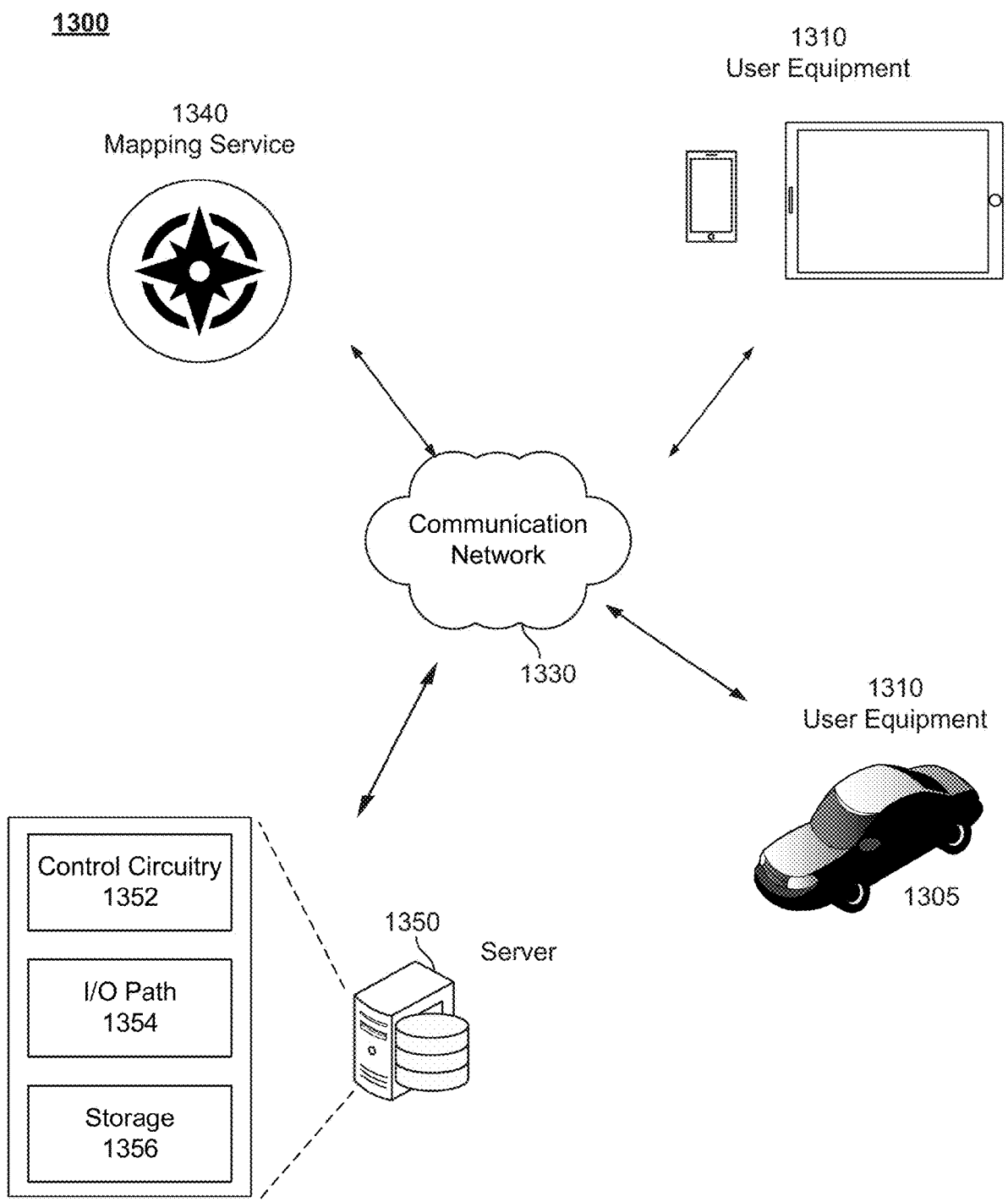
FIG. 13 depicts an illustrative diagram of a system for starting and ending navigation, in accordance with embodiments of the disclosure.

In another exemplary embodiment of the present disclosure and with reference to FIG. 13, system 1300 includes user equipment 1310, mapping service 1340, server 1350, which are able to communicate with one another using communication network 1330. In some embodiments, server 1350 includes control circuitry 1352 IO path 1354 and storage 1356. FIG. 13 illustrates generalized embodiments of an illustrative device, e.g., user equipment 105, 810, 910, 1010, 1110, 1210, 1310. For example, user equipment 1310 may be a smartphone device, a tablet, a computer, or a remote control, such as illustrative user equipment 1310. In other embodiments, user equipment 1310 is navigational equipment installed or included in a vehicle. In some embodiments, server 1350 may include one or more circuit boards. In some embodiments, the circuit boards may include control circuitry (e.g., control circuitry 1352) and storage (e.g., RAM, ROM, Hard Disk, Removable Disk, etc.) (e.g., storage 1356). In some embodiments, circuit boards may include an input/output path (e.g., I/O Path 1354). In some embodiments, user equipment device 1310 may receive content and data via input/output (hereinafter "I/O") path 1354. I/O path 1354 may provide content (e.g., mapping data/information available over a local area network (LAN) or wide area network (WAN), and/or other content) and data to control circuitry 1352 and storage 1356. Control circuitry 1352 may be used to send and receive commands, requests, and other suitable data using I/O path 1354. I/O path 1354 may connect control circuitry 1352 to one or more communications paths (described below). I/O functions may be provided by one or more of these communications paths but are shown as a single path in FIG. 13 to avoid overcomplicating the drawing.

Control circuitry 1352 should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate units, for example, multiple of the same type of processing units (e.g., two Intel Core i7 processors) or multiple different processors (e.g., an Intel Core i5 processor and an Intel Core i7 processor). In some embodiments, control circuitry 1352 executes instructions for an application stored in memory (e.g., storage 1356). Specifically, control circuitry 1352 may be instructed by the application to perform the functions discussed herein. For example, the application may provide instructions to control circuitry 1352 to generate the navigational information. In some implementations, any action performed by control circuitry 1352 may be based on instructions received from the application.

In client server-based embodiments, control circuitry 1352 may include communications circuitry suitable for communicating with a user device (e.g., user equipment 1310) or other networks or servers. The instructions for carrying out the functionality discussed herein may be stored on the server (e.g., server 1350). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry (e.g., I/O Path 1354). Such communications may involve the Internet or any other suitable communications networks or paths (e.g., I/O Path 1354). In addition, communications circuitry may include circuitry that enables peer-to-peer communication of user equipment devices, or communication of user equipment devices in locations remote from each other (described in more detail herein).

Memory may be an electronic storage device provided as storage 1356 that is part of control circuitry 1352. As referred to herein, the phrase "electronic storage device" or "storage device" should be understood to mean any device for storing electronic data, computer software, or firmware, such as random-access memory, read-only memory, hard drives, non-transitory computer readable medium, or any other suitable fixed or removable storage devices, and/or any combination of the same. Storage 1356 may be used to store various types of content, navigation data, and instructions for executing content access applications. Nonvolatile memory may also be used (e.g., to launch a boot-up routine and other instructions).

Control circuitry 1352 may include video-generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 1352 may also include scaler circuitry for upconverting and downconverting content into the preferred output format of the user equipment 1310. Circuitry 1352 may also include digital-to-analog converter circuitry and analog-to-digital converter circuitry for converting between digital and analog signals. The tuning and encoding circuitry may also be used to receive guidance data. The circuitry described herein, including for example, the tuning, video-generating, encoding, decoding, encrypting, decrypting, scaler, navigating, and analog/digital circuitry, may be implemented using software running on one or more general purpose or specialized processors. If storage 1356 is provided as a separate device from user equipment 1310, the mapping and encoding circuitry may be associated with storage 1356.

A user may send instructions to control circuitry 1352 using a user input interface (e.g., user interface 820, 920, 1020, 1120, 1220) that is part of user equipment (e.g., user equipment 1310). User input interface (e.g., user interface 820, 920, 1020, 1120, 1220) may be any suitable user interface, such as a remote control, mouse, trackball, keypad, keyboard, touchscreen, touchpad, stylus input, joystick, voice recognition interface, or other user input interfaces. The user interface (e.g., user interface 820, 920, 1020, 1120, 1220) may be provided as a stand-alone device or integrated with other elements of each one of user equipment device 1310 and system 1300. For example, user interface 820, 920, 1020, 1120, 1220 may be a touchscreen or touch-sensitive display. In such circumstances, user equipment 1310 may be integrated with or combined with user interface 820, 920, 1020, 1120, 1220.

Mapping service 1300 may be implemented using any suitable architecture. For example, mapping service 1300 may be a stand-alone application wholly implemented on user equipment device 1310. In such an approach, instructions for the application are stored locally (e.g., mapping database 1418), and data for use by the application is downloaded on a periodic basis (e.g., from an out-of-band feed, from an Internet resource, or using another suitable approach). Control circuitry at user equipment (e.g., 1310, 1410) retrieves instructions of the application from storage (e.g., mapping database 1418 or storage 1356) and process the instructions to generate any of the displays discussed herein. Based on the processed instructions, control circuitry may determine what action to perform when input is received from input interface (e.g., user interface 820, 920, 1020, 1120, 1220).

In an embodiment, user equipment 1310 requests navigation from mapping service 1340 using communication network 1330. In such an embodiment, user equipment 1310 can request turn-by-turn navigation, micro navigation, freedom navigation. In an exemplary embodiment, is argument 1310 W freedom navigation from mapping service 1340 using communication network 1330. In such an embodiment, user equipment 1310 requests freedom navigation mode to be implemented from a starting location to a final destination. User equipment 1310 displays a user interface that displays various information, for example, traffic information, weather information, identified traffic events, or any other information that may impact user equipment's 1310 journey from the starting location to the final destination. Additionally, the user interface displayed on user equipment 1310 Also provides user selectable inputs that switch between navigation modes. In an embodiment where user equipment 1310 Operates in freedom navigation mode, user equipment 1310 displays an identified traffic event and further displays a user selectable input that, when selected, switches user equipment 1310 from freedom navigation mode 2 micro navigation mode or turn-by-turn navigation mode. In session embodiment, user equipment 1310 communicates with mapping service 1340 using communication network 1330 to send and receive navigational information displayed on user equipment 1310.

In another exemplary embodiment, user equipment 1310 stores information. For example, user equipment 1310 stores navigational routes, starting locations, final destinations, points of interest, user preferences, user selections, or other information collected during navigation. Alternatively or in addition, some or all of the computational resources used by User equipment 1310 are implemented at server 1350. For example, information stored at user 1310 can be stored at server 1350, for example, at storage 1356. Additionally, some are all of the methods or processes implemented by user equipment 1310 are implemented at server 1350, for example, at control circuitry 1352. In such an embodiment, information can be communicated between server 1350 and User equipment 1310 over communication network 1330 and using, for example, IO path 1354. In some embodiments, mapping service 1340 is implemented at server 1350.

Figure 14:
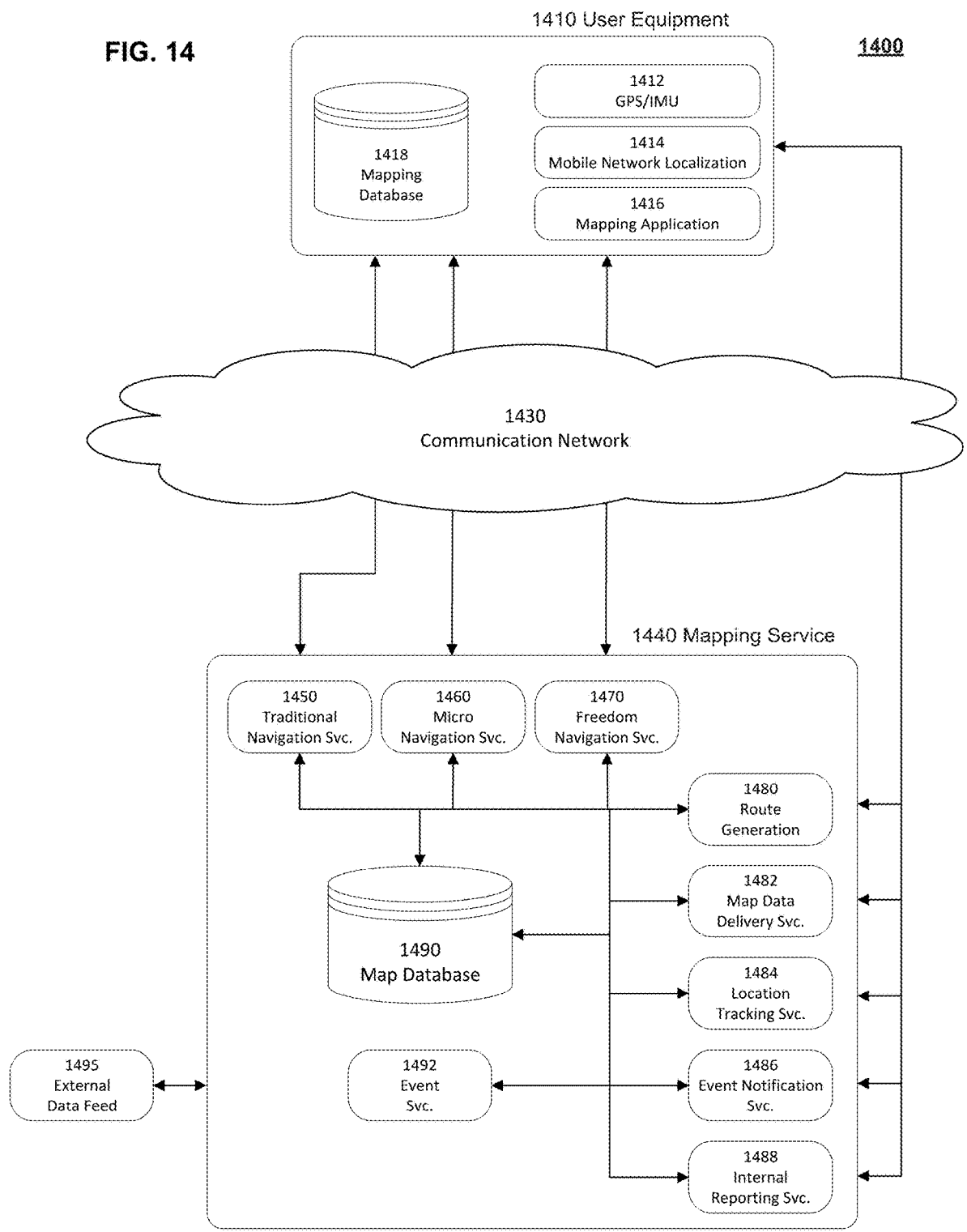
FIG. 14 depicts an illustrative diagram of a system for starting and ending navigation, in accordance with embodiments of the disclosure.

In another exemplary embodiment of the present disclosure and with reference to FIG. 14, system 1400 includes user equipment 1410 and mapping service 1440 which communicate over communication network 1430. In an exemplary embodiment, user equipment 1410 includes GPS/IMU 1412, mobile network localization 1414, mapping application 1416, and mapping database 1418. In some embodiments, user equipment 1410 includes a user interface. Global Positioning System 1412 (or GPS) is a satellite based radio navigation system that is readily available, the implementation of which will be readily apparent to one skilled in the art. Inertial measurement unit 1412 (or IMU) is an electronic device that measures and reports a body's specific force, angular rate, and orientation of the body, using a combination of, for example, accelerometers, gyroscopes, and magnetometers, the implementation of which will be readily apparent to one skilled in the art. In some embodiments, GPS/IMU 1412 provides the location of user equipment 1410 to implement the systems and methods described herein. In some embodiments, mobile network localization 1414 provides the location of user equipment 1410 to implement the systems and methods described herein. Mobile network localization 1414 determines the location of user equipment 1410 by, for example, triangulating the location of user equipment 1410 using one or more signals obtained from cellular networks. In some embodiments of the present disclosure, user equipment 1410 determines its location using a combination of information generated or obtained using GPS/IMU 1412 and mobile network localization 1414.

In an embodiment, mapping application 1416 uses information obtained from GPS/IMU 1412 and/or mobile network localization 1414 to implement navigation services, for example, turn-by-turn navigation, micro navigation, and freedom navigation. In such an embodiment, mapping application 1416 retrieves mapping and or geographic information from, for example, mapping database 1418. Mapping database 1418 comprises mapping information including routes, geographic information, traffic information, event information, or other information to be used by, for example, mapping application 1416. In some embodiments, mapping application 1418 contains historical data and user preferences. In such an embodiment, mapping application 1416 utilizes user preferences and historical information stored in mapping database 1418 to optimize routes for user equipment 1410 based on the historical data and/or user preferences.

In another exemplary embodiment, mapping service 1440 provides navigational routes. For example, traditional navigation service 1450 generates turn-by-turn navigation for mapping service 1440. In such an embodiment, mapping service 1440 obtains the determined device location using, for example, location tracking service 1484. Route generation 1480 uses the device location and map information, for example, obtained from map database 1490, to generate turn-by-turn navigation from a start location to a final destination. Route generation 1480 supplies the determined route to, for example, traditional navigation service 1450 for mapping service 1440. In this way, mapping service 1440 provides turn-by-turn navigation services.

In some embodiments, mapping service 1440 provides turn-by-turn navigation to, for example, user equipment 1410. In such an embodiment, mapping service 1440 obtains the location of user equipment 1410 by, for example, user equipment 1410 determining its location using, for example, GPS/IMU 1412 and mobile network localization 1414, communicating that information to mapping service 1440 using communication network 1430. Mapping service 1440 may additionally use location tracking service 1484 to track and/or determine the location of user equipment 1410. User equipment 1410 supplies a start location and a final destination using, for example, mapping application 1416, communicating that information over communication network 1430 to mapping service 1440. Mapping service 1440 generates a route from the supplied start location to the final destination using, for example, route generation 1480. Route generation 1480 obtains mapping information from, for example, map database 1490 and/or mapping database 1418. Traditional navigation service 1450 obtains the route generated by route generation 1480 through, for example, internal reporting service 1488. Traditional navigation service 1450 then supplies the generated route to user equipment 1410 by, for example, using map data delivery service 1482 and communicates the information over communication network 1430 to mapping application 1416 implemented at user equipment 1410. User equipment 1410 displays turn-by-turn navigation generated at mapping service 1440 using, for example, a user interface implemented at user equipment 1410.

In another exemplary embodiment karma system 1400 provides freedom navigation. In such an embodiment, mapping service 1440 generates freedom navigation from, for example, freedom navigation service 1470 and communicates that information to user equipment 1410 over, for example, communication network 1430. In an embodiment, user equipment 1410 determine this location using, for example, GPSI MU 1412 and or mobile network localization 1414 and communicates that information to mapping service 1440 over, for example, communication network 1430. In some embodiments, use your equipment 1410 determine this location at regular intervals and transmits that information to mapping service 1440 over communication network 1430. In this way, mapping service 1440 tracks the location of user equipment 1410 overtime using, for example, location tracking service 1484. Mapping service 1440 uses location tracking service 1484 to iteratively determine the location of user equipment 1410. Mapping service 1440 uses the location information of user equipment 1410 to determine possible routes user equipment 1410 can take to traverse from a starting location to a final destination. As User equipment 1410 update its location, mapping service 1440 also updates the possible routes that user equipment 1410 can use, thereby providing real-time freedom mode navigation to user equipment 1410.

In some embodiments, mapping service 1440 also provides traffic events to user equipment 1410. Such traffic events include any event that may affect the route that user equipment 1410 takes from the starting location to the final destination. In such an embodiment, mapping service 1440 may receive information from, for example, external data feed 1495. External data feed 1495 includes information from any external data source, for example, traffic information services and weather information services. Mapping service 1440 can use the information obtained from external data feed 1495 to update the routes determined by route generation 1480. For example, if mapping service 1440 obtains information relating to a traffic accident from, for example, external data feed 1495, mapping service 1440 uses that information to update route generation 1480. In such an embodiment, route generation 1480 may determine alternative routes for user equipment 1410 that avoid the received traffic accident. Such processes may be implemented and/or used by, for example, traditional navigation services 1450, micro navigation service 1460, or freedom navigation service 1470.

In an exemplary embodiment, user equipment 1410 implements freedom navigation mode. In such an embodiment, user equipment 1410 request freedom navigation services from mapping service 1440. User equipment 1410 provides a start location and a final destination. Mapping service 1440 receives the request including start location and final destination using, for example, communication network 1430. Mapping service 1440 uses the information to determine all possible routes ser equipment 1410 can use to traverse from the start location to the final destination. Mapping service 1440 uses, for example, route generation 1480, location tracking services 1484, and freedom of navigation services 1470 to determine the possible routes and track the location of user equipment 1410. Mapping service 1440 also utilizes information from map database 1490 to determine the possible routes and track the location of user equipment 1410. During the implementation of freedom navigation mode, mapping service 1440 determines the existence of a traffic event that may impact the route of user equipment 1410. Freedom navigation services 1470 and/or mapping service 1440 sends an event notification to user equipment 1410 using, for example, communication network 1430. In such an embodiment, event service 1492 may determine the severity and/or likelihood of impact of the determined traffic event. Event notification service 1486 receives information from event services 1492 and transmits that information using, for example, communication network 1430 to user equipment 1410. User equipment 1410 displays information related to the identified traffic event on, for example, a user interface implemented at user equipment 1410. In this way, user equipment 1410 displays traffic event notifications and, in some embodiments, provides user selectable inputs to switch between traditional navigation mode, micro navigation mode, and freedom navigation mode.

Continuing with the previous example, mapping service 1440 determines that the received traffic event will adversely impact the routes user equipment 1410 may take from the start location to its final destination. In such an embodiment, mapping service send a notification to user equipment 1410. User equipment 1410 in turn displays the notification on, for example, a user interface implemented at user equipment 1410. In some embodiments, the notification further includes a user selectable input to switch to micro navigation services that provide turn-by-turn navigation to user equipment 1410 that circumvents the identified traffic event. Mapping service 1440 receives a request from User and 1410 to provide turn-by-turn navigation services to circumvent the identified traffic event. Micro navigation service 1460 determines one or more routes that user equipment 1410 can traverse to circumvent the identified traffic event using, for example, route generation 1480. Mapping service 1440 sends that information to user equipment 1410 using, for example, communication network 1430. User equipment 1410 displays the micro navigation routing information obtained from mapping service 1440 on, for example, a user interface implemented at user equipment 1410. In some embodiments, User equipment 1410 also displays optional routes with user selectable inputs determined by mapping service 1440.

Continuing with the previous example, user equipment 1410 updates its location as determined by, for example, GPS/IMU 1412 and/or mobile network localization 1414, to mapping service 1440. Mapping service 1440 tracks the location of user equipment 1410 by, for example, using location tracking service 1484. Once mapping service 1440 determines that user equipment 1410 has sufficiently bypassed the identified traffic event, mapping service 1440 sends a notification to user equipment 1410. User equipment 1410 displays that notification on, for example, a user interface implemented at user equipment 1410. In some embodiments, user equipment 1410 provides user selectable inputs that terminate turn-by-turn navigation and/or resumes freedom navigation mode. In other embodiments, once user equipment 1410 receives the notification that it successfully bypassed the identified traffic event, user equipment 1410 automatically reverts back to freedom navigation mode by, for example, receiving information from mapping service 1440 and/or freedom of navigation service 1470. In this way, system 1400 implements freedom navigation mode and provides navigational services wherein it identifies a traffic event, provides a notification of the identified traffic event to user equipment 1410, provides turn-by-turn navigation services to bypass the event, and resumes freedom navigation mode, allowing user equipment 1410 to continue on its journey from its start location to its final destination.

Figure 15A:
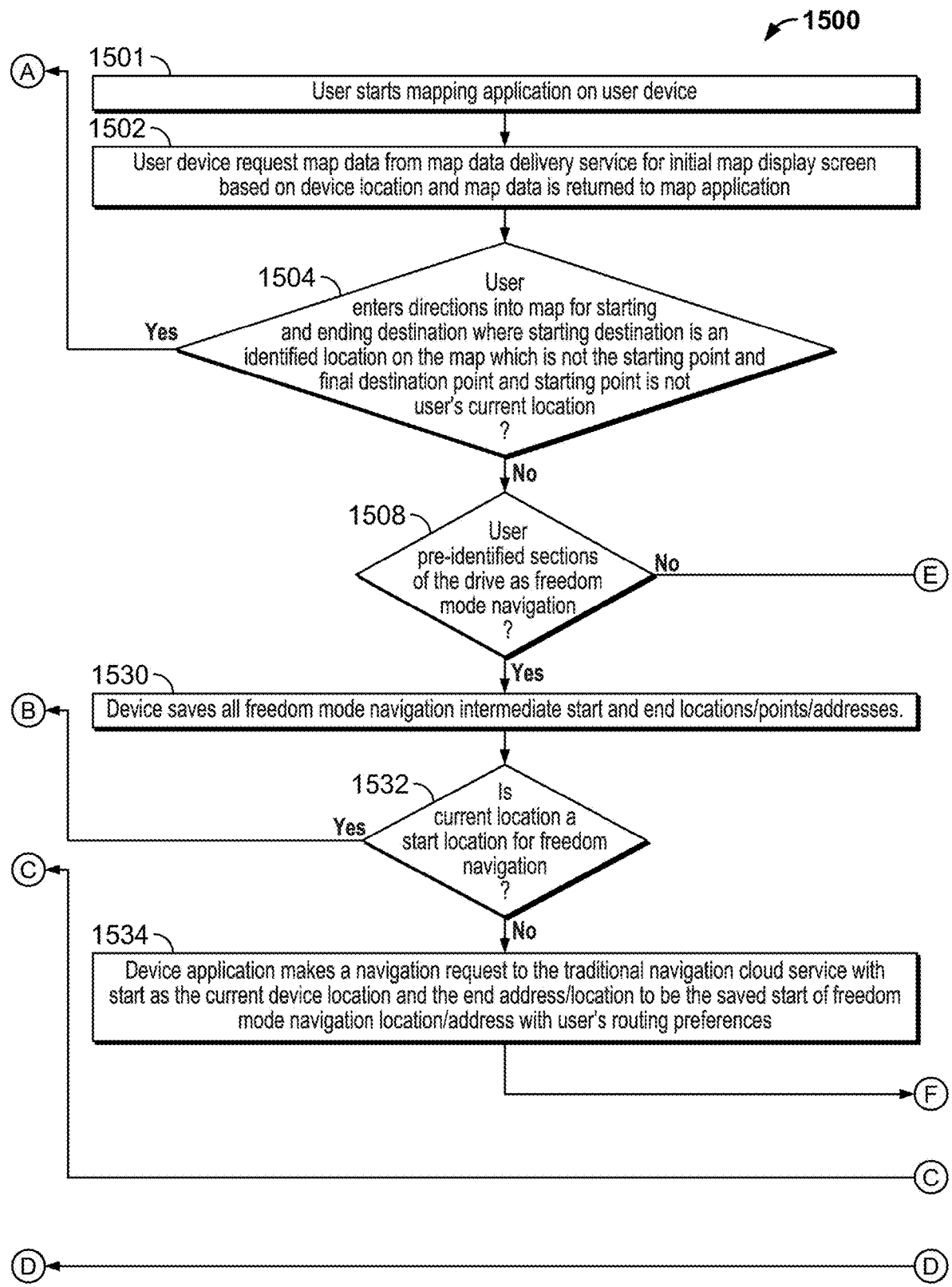
FIGS. 15A-15C depict an illustrative flowchart of a system for starting and ending navigation, in accordance with embodiments of the disclosure.
Figure 15B:
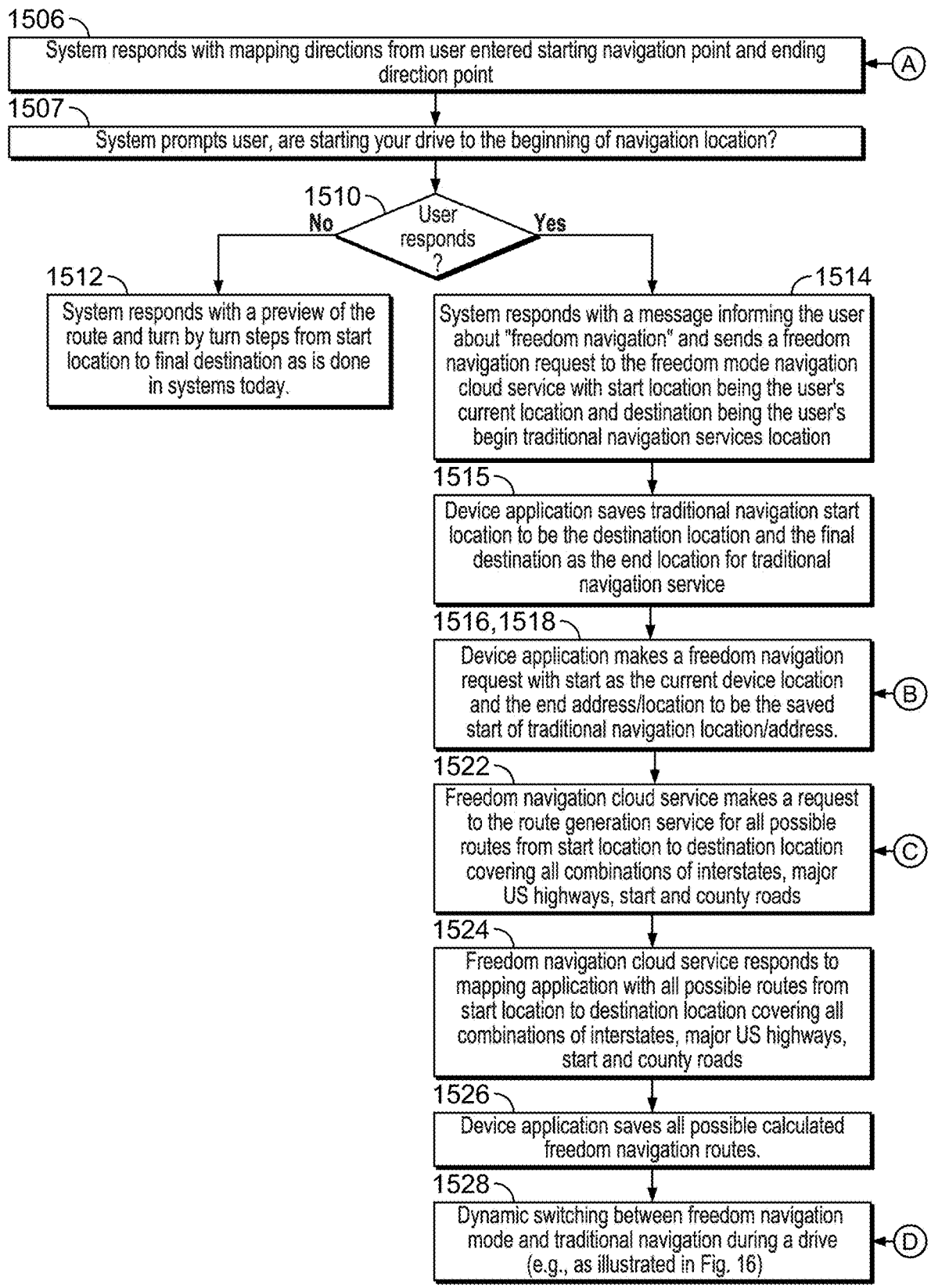
Figure 15C:
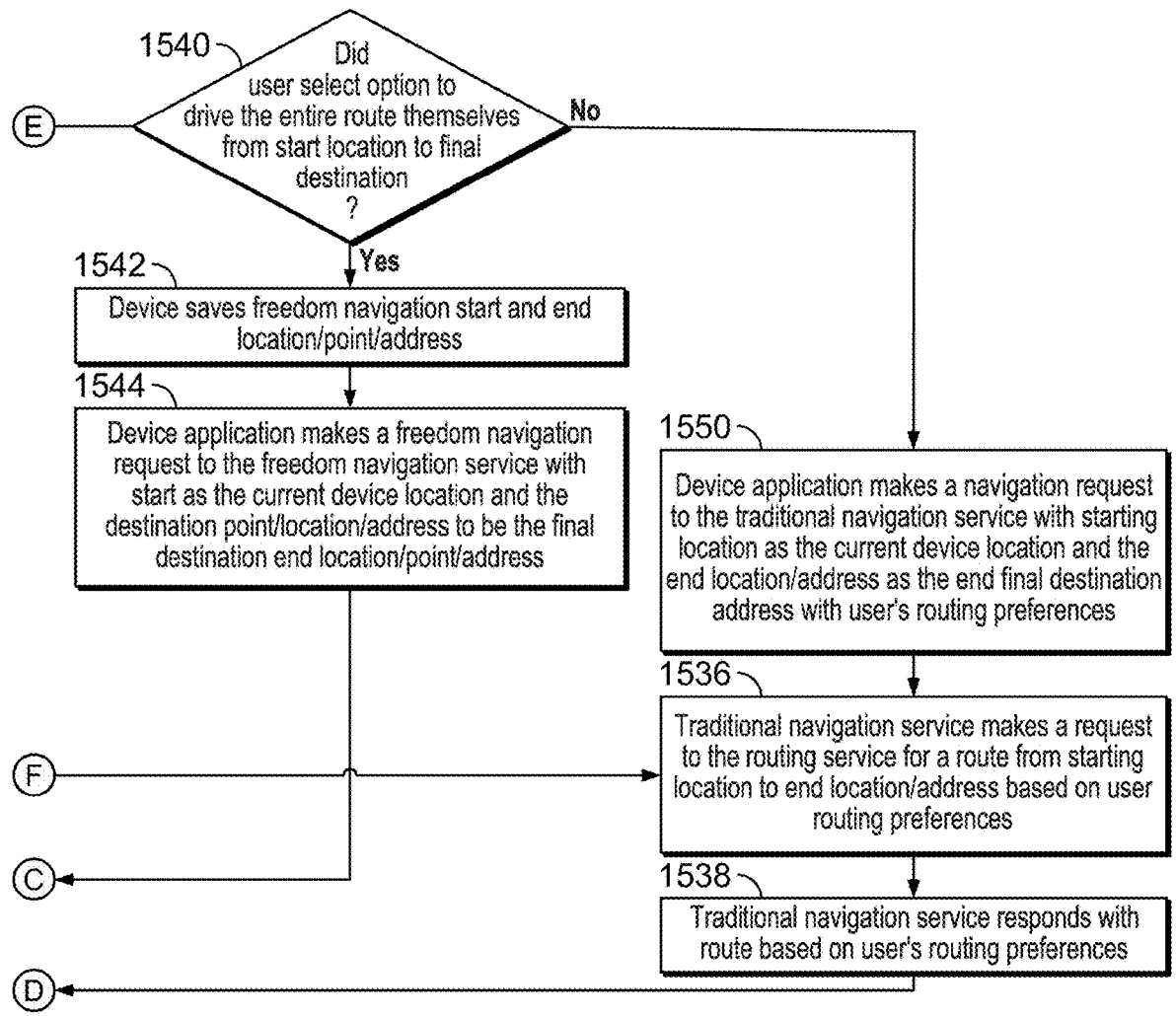

Flow chart of process 1500 providing navigation, in accordance with the embodiments of the present disclosure. In exemplary embodiment of the present disclosure of this reference to FIG. 15, system 1500 provides navigational services. At step 1502, control circuitry (e.g., control circuitry 1352) of user device (e.g., user equipment 1310, 1410 requests map data. For example, mapping application 1416 requests map data that may be retrieved from mapping database 1418 and/or map database 1490, as discussed with respect to FIG. 14. At step 1504, system 1500 determines whether the start location is the same as the current device location. In the event that the start location is the same as a current device location, system 1500 proceeds to step 1006. Conversely, if the start location is not the same as the current location, system 1500 proceeds to step 1508. Add set 1506, system 1500 provides navigation directions from the users entered starting navigation point to the ending navigation point. At step 1510, system displays a prompt indicating whether the user device is on route to the location where the turn-by-turn navigation begins. In the event that device is not en route to the location where the turn-by-turn navigation begins, system 1500 displays a preview of the route directions the start location to the final destination. In the event uh the device is en route to the location where the turn-by-turn navigation begins, system 1500 proceeds to step 1514, at which point the device indicates that freedom navigation mode has been engaged.

At step 1516, user device sends and navigation requests to the navigation service, for example, freedom navigation service 1470, as discussed with respect to FIG. 14. At step 1518, the user device stores traditional navigation start location as destination location the final destination at the end location or a traditional, turn-by-turn navigation service. For example, such information can be stored on mapping database 1418 and/or map database 1490, as discussed with respect to FIG. 14. At step 1520, user device sends freedom navigation request. At step 1522, freedom navigation service center request to, for example, brought generation come on requesting all possible routes from start location to the destination location that includes all possible combinations of interstates, highways, roads, or a thoroughfare. For example, navigation service 1470 sends a query to route generation 1480, location tracking service 1484, and map database 1490 to obtain this information, as discussed with respect to FIG. 14. In someone embodiments, step 1522 is implemented after 1544, as discussed in more detail below. At step 1524, freedom navigation service responds to the request it contains all possible routes. For example, freedom navigation 1470 responds to user device 1410 with all possible routes, as discussed with respect to FIG. 14. At step 1526, the routes received at step 1524 are stored. For example, the routes may be stored on mapping database 1418 and or mapping database 1490, as discussed with respect to FIG. 14. At step 1528, system 1500 engages in dynamic switching between freedom of navigation mode and traditional navigation mode.

Returning to step 1504, the user device receives a request for navigation including the starting and ending destination, where the starting destination and identify location that is not the starting point, and the final destination and the starting point is not current device location. At step 1508, the system determines whether the user device predefined sections of the route as being carried out in freedom navigation mode. If system 1500 determines that it has been predefined sections, the system proceeds to step 1530. In the event system determines that there are not predefined sections, system 1500 proceeds to step 1540. Add step 1530, system 1500 stores freedom navigation mode points, including intermediate start and end locations. For example, such information can be stored on mapping database 1418 and/or map database 1490, as discussed with respect to FIG. 14. At step 1532, system 1500 determines whether the device's current location matches start location of the freedom navigation. If it does, system 1500 proceeds to step 1520, as discussed with respect to FIG. 15 above. If it does not match, system 1500 proceeds to step 1534. At step 1534, freedom navigation information is stored, for example, at mapping database 418 and/or map database 1490, as discussed with respect to FIG. 14. At step 1536, the device's mapping application (e.g., mapping application 1416 as discussed with respect to FIG. 14) sends a traditional navigation request, with the start point as the current device location and the end location as the stored start location of the freedom navigation mode location. Step 1536 maybe implement it after step 1550, as discussed in more detail below. At step 1538, traditional navigation service sends over request the routing service for navigational route starting and ending at the locations determined at step 1536. At step 1552, traditional navigation service responds with the route based on the user's preferences. For example, traditional navigation service 1415 responds to the request by sending the routing information to user device 1410 using communication network 1430, as discussed with respect to FIG. 14. After step 1552 is executed, system 1500 proceeds with step 1528.

Returning to step 1508, in the event use a device does not have predefined sections of the route as being presented in freedom navigation mode, system 1500 proceeds to step

1540. At step 1540, system 1500 determines whether the user device specified that the entire route is to be user navigated. In the event that system 1500 determines that it is not, system 1500 proceeds to step 1550, where the freedom navigation service sends a request to the traditional navigation service with the starting location as the current user device location and the end location as the final destination. In some embodiments, the request also includes user preferences. System 1500 then proceeds to step 1522, as discussed herein.

Figure 16A:
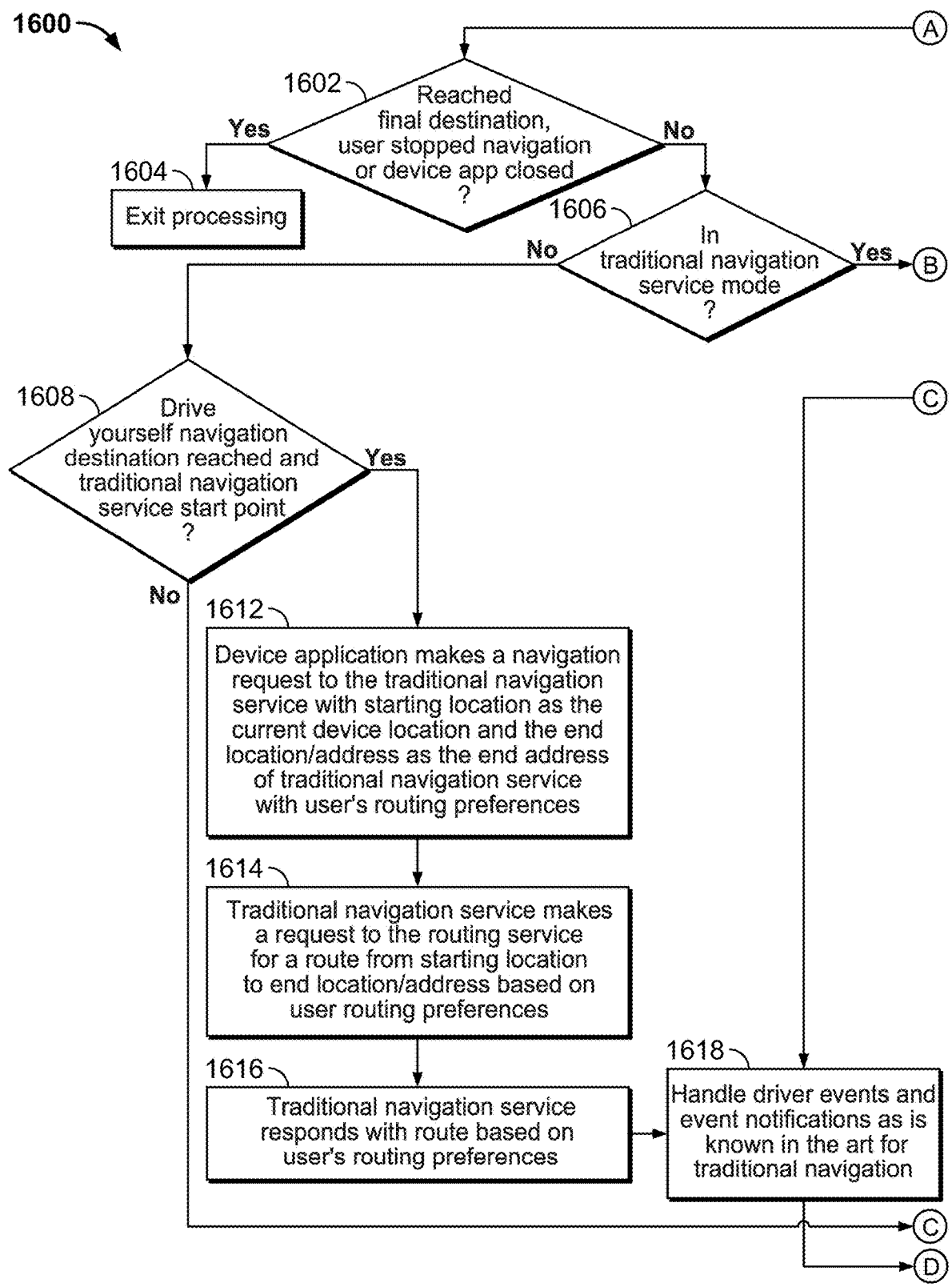
FIGS. 16A-16B depict an illustrative flowchart of a system for starting and ending navigation, in accordance with embodiments of the disclosure.
Figure 16B:
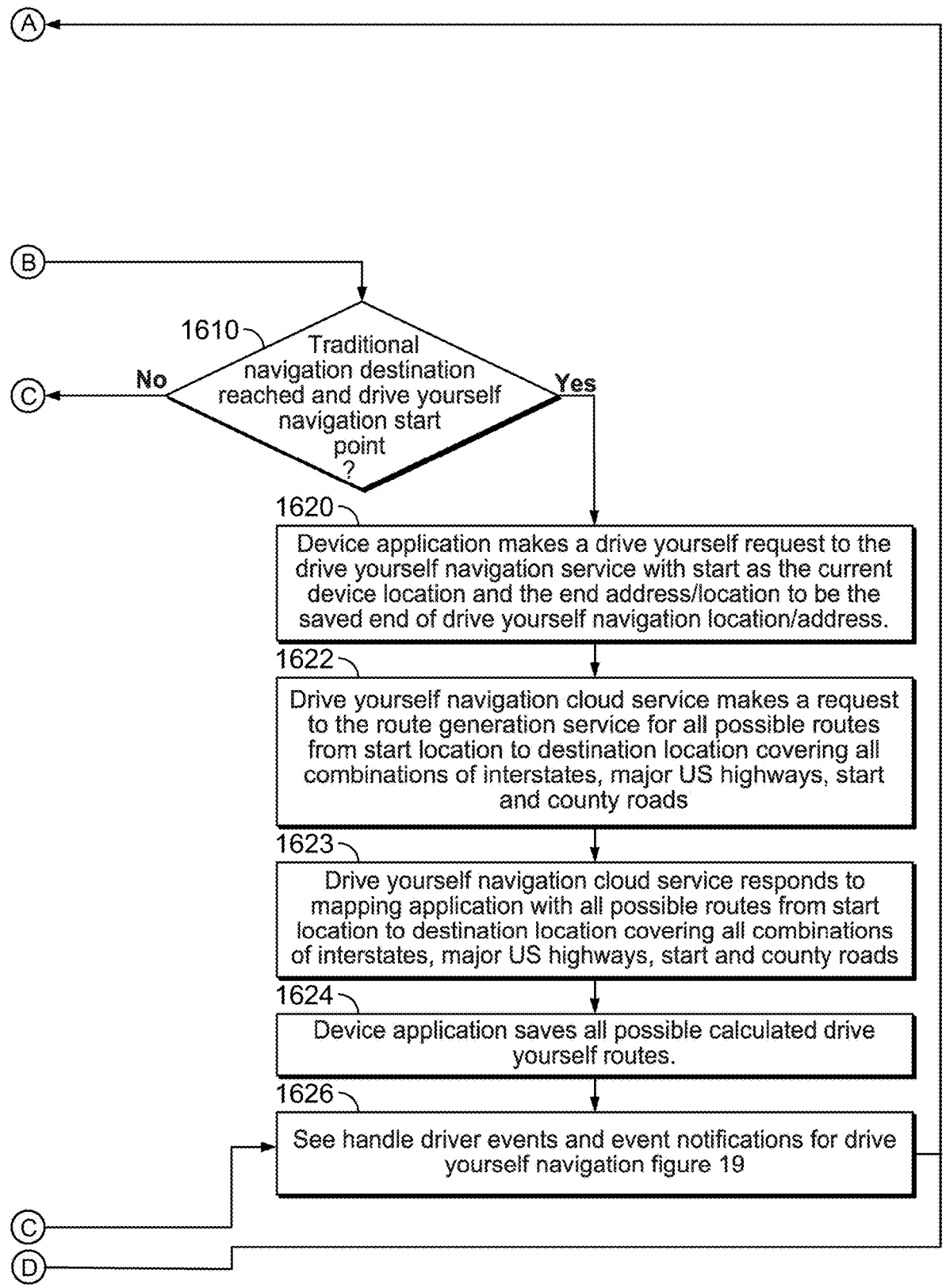

In another exemplary embodiment of the present disclosure and respect FIG. 16, an illustrative flow chart of process 1600 for providing navigational services is presented, in accordance with embodiments of the present disclosure. At step 1602, system 1600 determines whether the user device has reached the final destination or that the mapping application has otherwise ceased providing navigation (e.g., the mapping application has been closed). If so, system 1600 proceeds step 1604, wherein system 1600 exits processing. If not, system 1600 proceed to step 1606. At step 1606, system 1600 determines whether navigation is being provided in traditional navigation mode (e.g., turn-by-turn navigation). In the event system 1600 determines that traditional navigation mode is engaged, system 1600 proceeds to step 1610. In the event that system 1600 determines that traditional navigation mode is not engaged, system 1600 proceeds to step 1608. At step 1608, system 1600 determines whether freedom navigation destination has been reached and that the starting point for traditional navigation mode is reached. In the event that it has not, system 1600 proceeds to step 1626. In the event that it has, system 1600 proceeds to step 1612.

At step 1612, user device application send a traditional navigation request with the starting location as the current device location and the end location as the end location of the traditional navigation service. In some embodiments, the request further includes user routing preferences. At step 1614, the traditional navigation service sends a request to the routing service for a navigational route from the starting location to the end location based on user preferences. At step 1616, the traditional navigation service responds with turn-by-turn directions that are based on the user preferences. At step 1618, the navigation route is implemented. For example, mapping information is displayed on user interface 820, 920, 1020, 1120, and/or 1220, as discussed with respect with respect to FIGS. 8 through 12, respectively.

Returning to step 1606, in the event that system 1600 determines that the traditional navigation mode is engaged, system 1600 proceeds to step 1610. At step 1610, system 1600 determines whether the traditional navigation mode destination has been reached and the freedom navigation mode start point has also been reached. In the event that it has not, system 1600 proceeds the step 1618, as discussed above. In the event that system 1600 determines that the freedom navigation mode start point has been reached, system 1600 proceeds to step 1620. At step 1620, mapping application sands a freedom navigation mode request to the freedom navigation service, where the start point has the current device location and the end point as the saved location of freedom navigation. At step 1622, freedom navigation service sends a request to the route generation service, requesting all possible routes from the start location to the destination location. For example, freedom navigation service 1470 sends a request to route generation 1480 for all possible routes, as discussed with respect to FIG. 14. Freedom navigation service (e.g., freedom navigation service 1470) responds to the request with all possible routes from the start location to the destination location. At step 1624, system 1600 stores the routes. For example, the routes are stored in mapping database 1418 and/or map database 1490, as discussed with respect to FIG. 14.

Figure 17A:
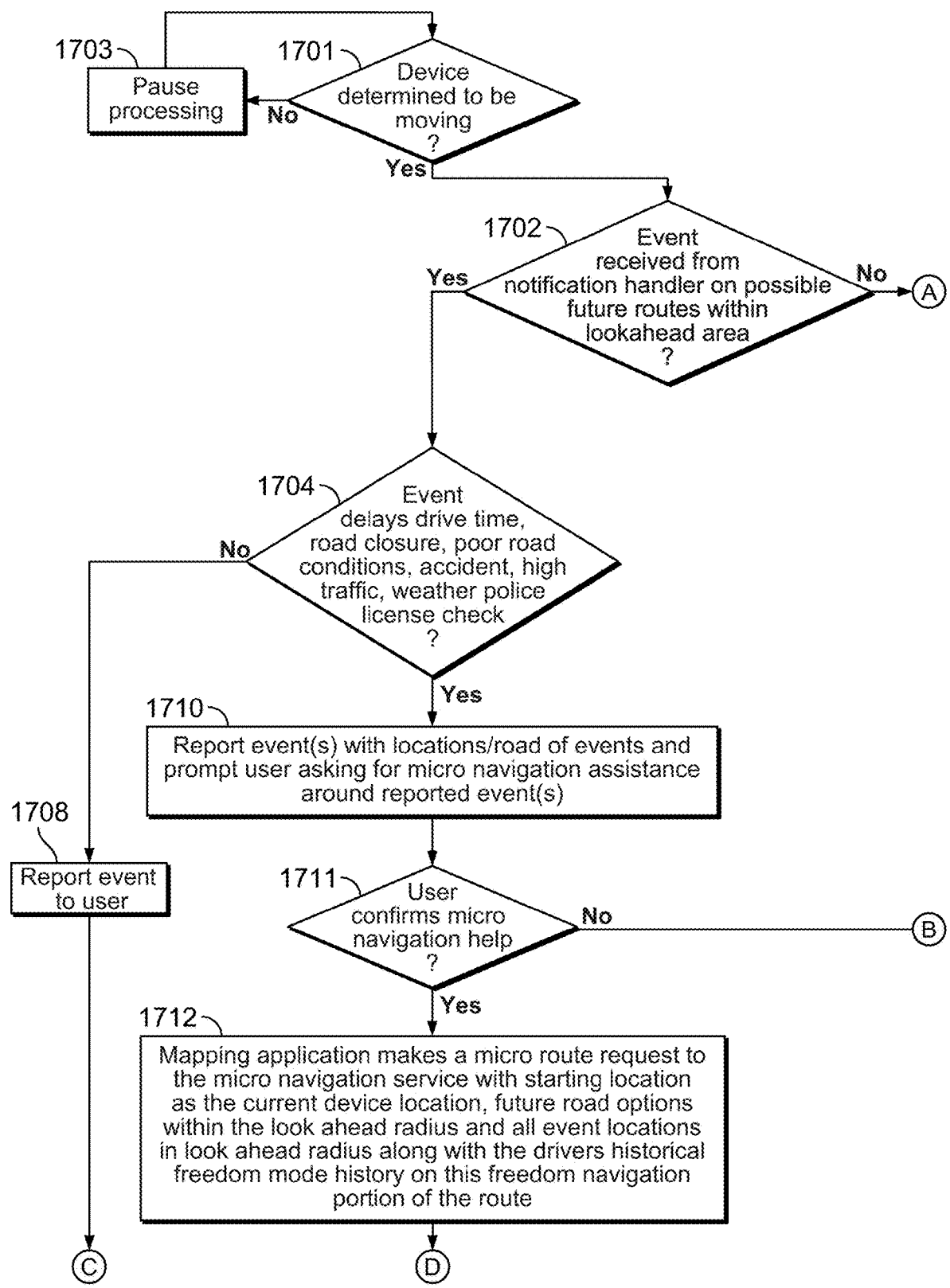
FIGS. 17A-17C depicts an illustrative flowchart of a system for starting and ending navigation, in accordance with embodiments of the disclosure.
Figure 17B:
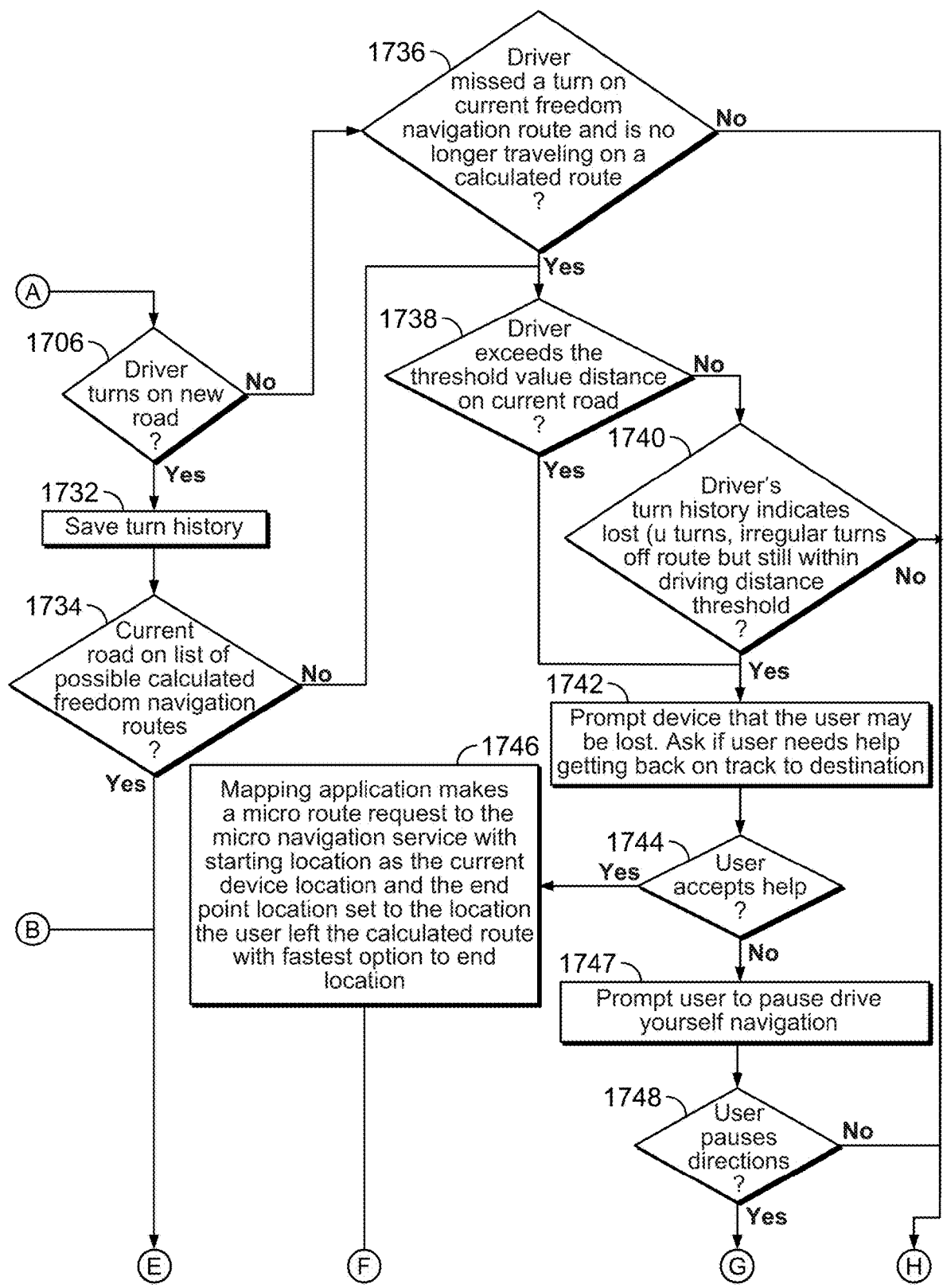
Figure 17C:
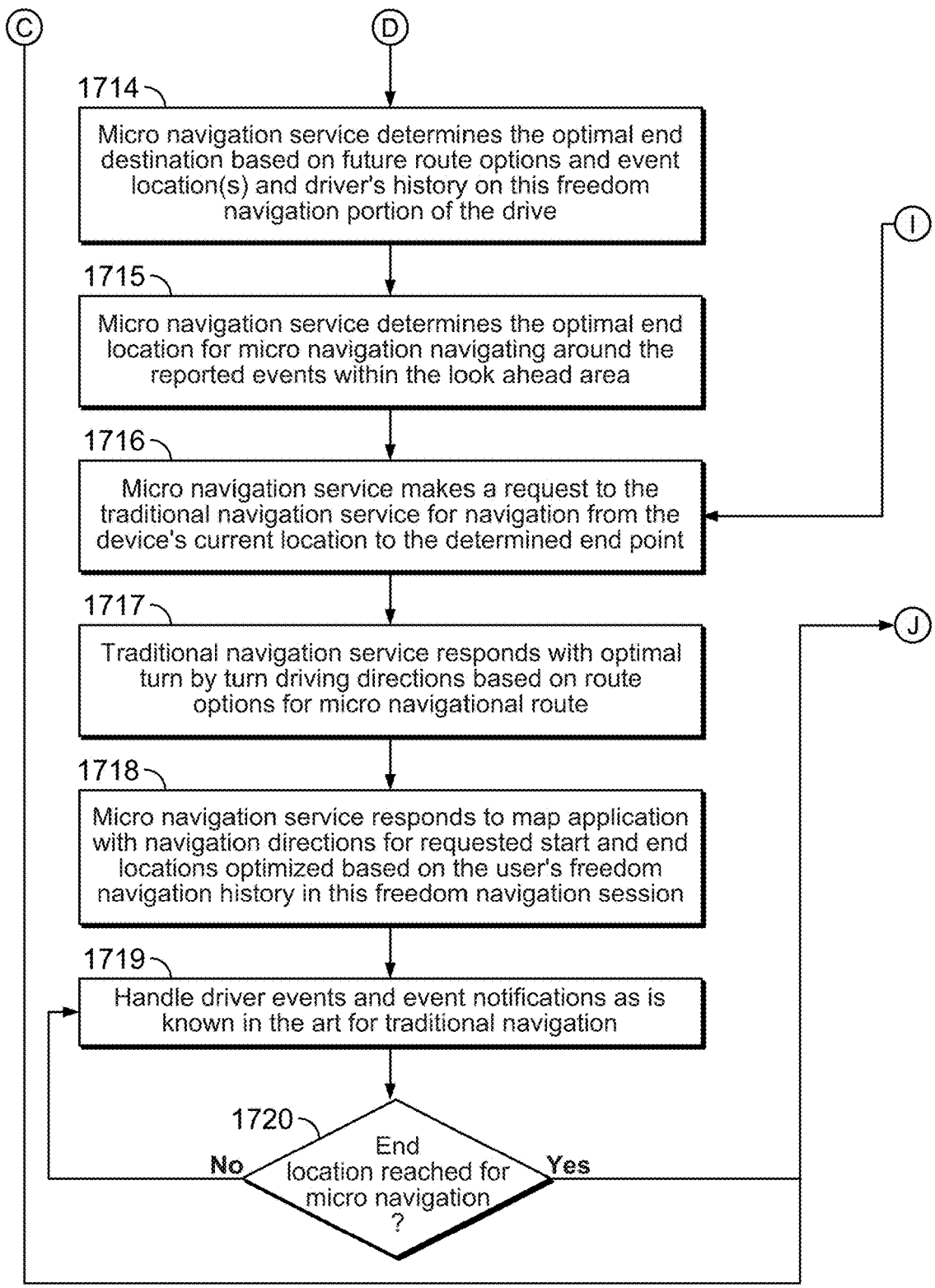

FIG. 17 depicts an illustrative flow chart of process 1700 for providing navigational services in conjunction with receiving event notifications, in accordance with embodiments of the present disclosure. At step 1702, the system determines whether an event notification received that may impact possible routes within a lookahead area. Any event that it has, system 1700 proceeds to step 1704. In the event that it has not, system 1700 proceeds to step 1706. At step 1704, system 1700 determines whether the event effects possible route time, Rd. closure, contributes to poor conditions, relates to an accident, relates to an increased level of traffic color or as any other event that would cause a delay. If system 1700 determines that it would does not, system 1700 proceeds to step 1708, wherein system 1700 reports the event to the user device, for example, by displaying an event indicator on a user device. In the event that it does, system 1700 proceeds to step 1710.

At step 1710, system 1700 reports the event including location and other parameters of the event. System 1700 further prompts the user device with an option to engage micro navigation to navigate around and bypass the reported event. In the event the user device does not confirm micro navigation mode, system 1700 proceeds to step 1724, as discussed in more detail below. In the event that user device engages micro navigation mode, system 1700 proceeds to step 1712.

At step 1712, the mapping application (e.g., mapping application 1416 as discussed with respect to FIG. 14) sends a micro navigation route request to micro navigation service (EG, micro navigation service 1416) with the starting location as the user device is current location, and potential routes within the look ahead area, along with all event locations in the look ahead area. At step 1714, micro navigation service (e.g., micro navigation service 1416) determines the optimal end location for the micro navigation service based on future route options and the event locations. In some embodiments, system 1700 further considers historical information. Additionally, micro navigation service sends a request to the traditional navigation service for navigation directions from the device's current location to the determined end point of the micro navigation service. In this way, system 1700 leverages existing traditional navigation services and incorporates those into embodiments of the present disclosure. In some embodiments, step 1714 is implemented after step 1746, as discussed in more detail herein. At step 1716, traditional navigation service responds with optimal turn-by-turn navigation directions based on the route options for micro navigation. At step 1718, micro navigation service (e.g., micro navigation service 1460) responds to the mapping application (e.g., mapping application 1416) with navigational directions for the requested start and end locations. In some embodiments, the response is optimized based on historical information and/or user preferences. Uh step 1720, system 1700 determines whether the user device reached the micro navigation end location. In the event that it has, system 1700 proceeds to step 1724. In the event that it has not, system 1700 proceeds to step 1722, wherein system 1700 adjusts the look ahead area.

At step 1706, system 1700 determines whether the user device is on a new road. In the event that it has not, system 1700 proceeds to step 1736. In the event that it has, system 1700 proceeds to step 1732, wherein the route or various parameters thereof are stored in a database, for example, mapping database 1418 and/or map database 1490. At step 1734, system 1700 determines whether the road on which the user device is located is included in the determined list of possible freedom navigation mode routes. In the event that it is not, system 1700 proceeds to step 1738. In the event that it is, system 1700 proceeds to step 1724.

At step 1724, system 1700 prompts the user device to switch to traditional, turn-by-turn navigation. In the event that user device does not switch to traditional navigation, system 1700 proceeds to step 1722, wherein system 1700 adjusts the look ahead area. In the event that the user device switches to traditional navigation, system 1700 proceeds to step 1726. At step 1726, system 1700 determines whether an end location is provided for the traditional navigation service. In the event that an end location is not provided, system 1700 proceeds to step 1730. In the event that an end location is provided, system 1700 proceeds to step 1728. At step 1728, system 1700 creates a traditional navigation route with the starting point as the current user device location and the end point as the supplied ending point for the traditional application (e.g., the end location provided as discussed with respect to step 1726). At step 1730, system 1700 creates a new route in traditional navigation mode with the starting point as the current device location and the end point as the next transition state for the current navigational mode. Subsequent to steps 1728 and 1730, system 1700 proceeds so step 1722.

Returning to step 1736, system 1700 determines whether the user device is on a route that is not listed as a possible route in a freedom navigation mode (e.g., missed turn and travelling on a route that is not determined to be a possible route to reach the specified destination). In the event that it is, system 1700 proceeds to step 1722, as discussed herein. In the event that it is not, system 1700 proceeds to step 1738. At step 1738, system 1700 determines whether the user device has exceeded it threshold distance. In the event that it's not, system 1700 determines whether the user device may be lost. For example, historical data may indicate that the user device has never traveled on this particular road, or that the user device appears to be embarking on irregular turns, has departed of from the calculated routes, or is double backing (e.g., making U-turns). In the event that system 1700 determines these are device may be lost, system 1700 proceeds to step 1742. Additionally, system 1700 may also proceed to step 1742 subsequent do step 1738.

At step 1742, system 1700 prompts the user device that the user device may be lost and provides a user selectable input to generate turn-by-turn navigation that leads the user device back to a predetermined route. In the event that the user device request navigation, system 1700 proceeds the step 1746. In the event that the user device does not request turn-by-turn navigation, system 1700 proceeds step 1748. At step 1748, system 1700 provides a user selectable input to pause freedom navigation mode. In the event that user device does not pause freedom navigation mode, system 1700 proceeds to step 1722, as discussed herein. In the event system 1700 determines that the user device pauses freedom navigation mode, system 1700 proceeds steps 1750 and 1752, wherein the navigation is paused and system 1700 loops between step 1752 and step 1750 until the user device resumes freedom navigation mode. At step 1754, system 1700 sends a micro navigation route request to the micro navigation service (e.g., micro navigation service 1460) with the starting location as the current user device location and the end location and the closest location to a route of the possible routes determined for the freedom navigation mode. Subsequent to step 1754, system 1700 proceeds to step 1714, as discussed here in.

It is contemplated that some suitable steps or suitable descriptions of FIGS. 13-17 may be used with other suitable embodiments of this disclosure. In addition, some suitable steps and descriptions described in relation to FIGS. 13-17 may be implemented in alternative orders or in parallel to further the purposes of this disclosure. For example, some suitable steps may be performed in any order or in parallel or substantially simultaneously to reduce lag or increase the speed of the system or method. Some suitable steps may also be skipped or omitted from the process. Furthermore, it should be noted that some suitable devices or equipment discussed in relation to FIGS. 1-12 could be used to perform one or more of the steps in FIGS. 13-17.

The processes discussed herein are intended to be illustrative and not limiting. For instance, the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   receiving, by a navigation server from a user device, a request for navigation in a freedom navigation mode, the request comprising an end location, wherein while navigating in the freedom navigation mode, the navigation server causes the user device to not display navigational directions to the end location;
   determining a plurality of routes from a location of the user device to the end location;
   identifying a location of a traffic event on at least one route of the plurality of routes from the location of the user device to the end location;
   based on identifying the location of the traffic event, determining a likelihood of the user device travelling near the identified location of the traffic event using a route of the plurality of routes based on a user profile associated with the user device, while no navigational directions are displayed for the route;
   based on the likelihood of the user device travelling near the identified location of the traffic event using a route of the plurality of routes, sending a traffic event notification for display on the user device;
   receiving, from the user device, a micro navigation request and a current location of the user device, wherein the micro navigation request is based at least in part on the traffic event notification;
   based on receiving the micro navigation request, (1) causing the user device to switch from the freedom navigation mode to a micro navigation mode, and (2) determining, based on the received current location of the user device, a plurality of micro navigation routes that bypass the location of the traffic event;

sending, to the user device, one or more of the routes of the plurality of micro navigation routes; and while in the micro navigation mode, causing a route of the plurality of micro navigation routes to be displayed at the user device.

2. The method of claim 1, wherein the navigation server causes the user device to display an indication of navigating from the location of the user device to the end location in the freedom navigation mode.

3. The method of claim 1, wherein the request for navigation further comprises a requested navigation mode.

4. The method of claim 1,
wherein determining the plurality of routes from the location of the user device to the end location comprises:
retrieving, from a database, mapping information related to a plurality of possible routes encompassing the location of the user device and the end location;
determining, from the received mapping information, the plurality of possible routes from the location of the user device to the end location;
ranking the determined plurality of possible routes based on travel time or travel distance; and
determining a subset of the plurality of routes from the location of the user device to the end location based on a threshold;
wherein the plurality of routes comprises the determined subset of the plurality of routes from the location of the user device to the end location.

5. The method of claim 1, wherein the micro navigation request comprises a micro navigation end location.

6. The method of claim 5, wherein each of the plurality of micro navigation routes ends within a predetermined distance of the micro navigation end location.

7. The method of claim 1, further comprising:
determining, based on the user profile associated with the user device, a likelihood that the user device will not reach the end location within a predetermined amount of time; and
based on the determining that the user device will not reach the end location within the predetermined amount of time and without further input at the user device, sending, from the user device, the micro navigation request and the current location of the user device.

8. A method comprising:
sending, from a user device, a request for navigation from a user device location to an end location in a freedom navigation mode, wherein while navigating in the freedom navigation mode, the user device does not display navigational directions;
determining a plurality of routes from the user device location to the end location;
identifying a location of a traffic event on at least one route of the plurality of routes from the user device location to the end location;
based on identifying the location of the traffic event, determining a likelihood of the user device travelling near the identified location of the traffic event using a route of the plurality of routes based on a user profile associated with the user device, while no navigational directions are displayed for the route;
based on the likelihood of the user device travelling near the identified location of the traffic event using one of the plurality of routes, displaying a traffic event notification at the user device;
receiving, from the user device, a micro navigation request and a current location of the user device, wherein the micro navigation request is based at least in part on the traffic event notification;
based on receiving the micro navigation request, (1) switching from the freedom navigation mode to a micro navigation mode, and (2) determining, based on the received current location of the user device, a plurality of micro navigation routes that bypass the location of the traffic event; and
while in the micro navigation mode, displaying a route of the plurality of micro navigation routes to be displayed.

9. The method of claim 8, wherein each micro navigation route of the plurality of micro navigation routes begins at the current location of the user device and ends at a location along a route of the plurality of routes from the current location of the user device to the end location, and wherein each micro navigation route of the plurality of micro navigation routes does not include the location of the traffic event.

10. The method of claim 8,
wherein the plurality of routes from the user device location to the end location are determined by:
retrieving, from a database, mapping information related to a plurality of possible routes encompassing the user device location and the end location;
determining, from the received mapping information, the plurality of possible routes from the user device location to the end location;
ranking the determined plurality of possible routes based on travel time or travel distance; and
determining a subset of the plurality of possible routes from the user device location to the end location based on a threshold;
wherein the plurality of routes comprises the determined subset of the plurality of possible routes.

11. The method of claim 8, wherein information related to the traffic event is received from a traffic information reporting service.

12. The method of claim 8, wherein the request for navigation further comprises a requested navigational mode.

13. The method of claim 9, wherein each of the plurality of micro navigation routes ends within a predetermined distance of a micro navigation end location.

14. A system comprising:
a memory configured to store mapping information;
control circuitry configured to:
determine a plurality of routes from a location of a user device to an end location;
identify a location of a traffic event on at least one route of the plurality of routes from the location of the user device to the end location;
determine a likelihood of the user device travelling near the identified location of the traffic event using a route of the plurality of routes based on a user profile associated with the user device, while no navigational directions are displayed for the route;
based on receiving a micro navigation request, (1) cause the user device to switch from a freedom navigation mode to a micro navigation mode, and (2) determine, based on a received current location of the user device, a plurality of micro navigation routes that bypass the location of the traffic event; and
while in the micro navigation mode, cause a route of the plurality of micro navigation routes to be displayed at the user device;
input/output circuitry configured to:

receive, from the user device, a request for navigation in the freedom navigation mode, the request comprising the end location, wherein while navigating in the freedom navigation mode, the user device does not display navigational directions;

send a traffic event notification for display at the user device based on the likelihood of the user device travelling near the identified location of the traffic event using a route of the plurality of routes, wherein the traffic event notification is displayed without displaying navigational directions;

receive, from the user device, the micro navigation request and the current location of the user device, wherein the micro navigation request is based at least in part on the traffic event notification; and send, to the user device, one or more of the routes of the plurality of micro navigation routes.

15. The system of claim 14, wherein the control circuitry is further configured to:

retrieve, from a database, mapping information related to a plurality of possible routes encompassing the location of the user device and the end location;

determine, from the received mapping information, the plurality of possible routes from the location of the user device to the end location;

rank the determined plurality of possible routes based on travel time or travel distance; and determine a subset of the plurality of possible routes based on a threshold value;

wherein the plurality of routes comprises the determined subset of the plurality of possible routes.

16. The method of claim 1, wherein the traffic event is at least one of a construction zone, an accident, a police checkpoint, a speed trap, a road closure, adverse weather conditions, or debris being present in a roadway.

17. The method of claim 5, further comprising:

based on determining that the user device reaches the micro navigation end location, ceasing to cause the route of the plurality of micro navigation routes to be displayed at the user device.

18. The method of claim 17, wherein the micro navigation end location is a predetermined distance from the location of the traffic event.

* * * * *